United States Patent
Takizawa

(10) Patent No.: US 12,510,353 B2
(45) Date of Patent: Dec. 30, 2025

(54) MOIRÉ DISPLAYS, DEVICES FOR GENERATING MOIRÉ-PRODUCING PATTERN, SYSTEMS FOR GENERATING MOIRÉ-PRODUCING PATTERN, AND METHODS FOR GENERATING MOIRÉ-PRODUCING PATTERN

(71) Applicant: TOPPAN INC., Tokyo (JP)

(72) Inventor: Yumi Takizawa, Tokyo (JP)

(73) Assignee: TOPPAN INC., Tokyo (JP)

(*) Notice: Subject to any disclaimer, the term of this patent is extended or adjusted under 35 U.S.C. 154(b) by 199 days.

(21) Appl. No.: 18/117,830

(22) Filed: Mar. 6, 2023

(65) Prior Publication Data
US 2023/0204350 A1 Jun. 29, 2023

Related U.S. Application Data

(63) Continuation of application No. PCT/JP2021/029760, filed on Aug. 12, 2021.

(30) Foreign Application Priority Data

Sep. 7, 2020 (JP) .................................. 2020-149601

(51) Int. Cl.
*G01B 11/25* (2006.01)
(52) U.S. Cl.
CPC ........ *G01B 11/254* (2013.01); *G01B 11/2513* (2013.01)
(58) Field of Classification Search
CPC .............. G01B 11/254; G01B 11/2513; B42D 25/351; B42D 25/342; B44F 1/10; B41M 3/14; B41M 3/148; G09F 19/12
See application file for complete search history.

(56) References Cited

U.S. PATENT DOCUMENTS

| | | | |
|---|---|---|---|
| 4,876,121 A | 10/1989 | Cohen | |
| 2007/0097441 A1* | 5/2007 | Wang | ...................... B41M 3/06 358/3.06 |

FOREIGN PATENT DOCUMENTS

| | | |
|---|---|---|
| EP | 1 780 577 A1 | 5/2007 |
| EP | 3 530 479 A1 | 8/2019 |

(Continued)

OTHER PUBLICATIONS

European Partial Supplementary Search Report issued in corresponding European Patent Application No. 21864080.3 dated Jan. 29, 2024 (13 pages).

(Continued)

*Primary Examiner* — Georgia Y Epps
*Assistant Examiner* — Monica T Taba
(74) *Attorney, Agent, or Firm* — Foley & Lardner LLP

(57) ABSTRACT

A pattern for producing a moiré image with a sense of movement and technique for creating such patterns. A moiré display includes: a first pattern; and a second pattern disposed offset from the first pattern by a predetermined distance, the second pattern having a phase which continuously changes relative to the first pattern in at least one region. For example, a moiré image with a sense of movement can be produced when the second pattern has a phase that changes according to a function in at least one section. Accordingly, a moiré image with a sense of natural movement can be produced by inputting an input image and data such as a feature value of the input image.

6 Claims, 28 Drawing Sheets

(56) References Cited

FOREIGN PATENT DOCUMENTS

| | | | |
|---|---|---|---|
| JP | 2001-301306 | A | 10/2001 |
| JP | 2007-128075 | A | 5/2007 |
| JP | 4403694 | B2 | 1/2010 |
| JP | 6218986 | B1 | 10/2017 |
| WO | WO-2019056066 | A1 * | 3/2019 |
| WO | WO-2020/096009 | A | 5/2020 |

OTHER PUBLICATIONS

European Extended Search Report issued in corresponding European Patent Application No. 21864080.3 dated Jun. 6, 2024 (15 pages).
International Searching Authority, "International Search Report," issued in connection with International Patent Application No. PCT/JP2021/029760, dated Oct. 19, 2021.
International Searching Authority, "Written Opinion," issued in connection with International Patent Application No. PCT/JP2021/029760, dated Oct. 19, 2021.

* cited by examiner

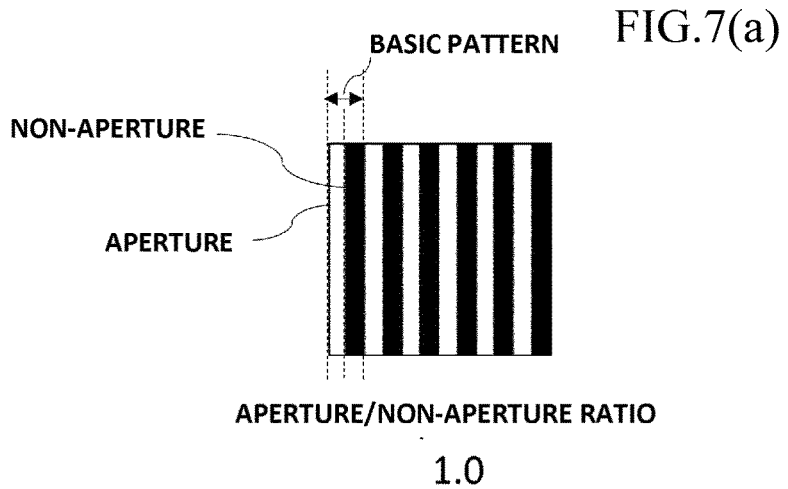
FIG.7(a) BASIC PATTERN, NON-APERTURE, APERTURE
APERTURE/NON-APERTURE RATIO 1.0

APERTURE/NON-APERTURE RATIO
1.5

APERTURE/NON-APERTURE RATIO
2.0

APERTURE/NON-APERTURE RATIO
2.5

APERTURE/NON-APERTURE RATIO
3.0

APERTURE/NON-APERTURE RATIO
4.0

APERTURE/NON-APERTURE RATIO
9.0

VISIBLE REGION [mm] = PITCH OF FIRST PATTERN [mm] x BASIC VISIBLE REGION [mm]

MOIRÉ DISPLAYS, DEVICES FOR GENERATING MOIRÉ-PRODUCING PATTERN, SYSTEMS FOR GENERATING MOIRÉ-PRODUCING PATTERN, AND METHODS FOR GENERATING MOIRÉ-PRODUCING PATTERN

CROSS-REFERENCE TO RELATED PATENT APPLICATIONS

This application is a continuation application filed under 35 U.S.C. § 111 (a) claiming the benefit under 35 U.S.C. §§ 120 and 365 (c) of International Patent Application No. PCT/JP2021/029760, filed on Aug. 12, 2021, which in turn claims the benefit of JP 2020-149601, filed Sep. 7, 2020, the disclosures of all which are incorporated herein by reference in its entirety.

TECHNICAL FIELD

The present invention relates to moiré displays, devices for generating moiré-producing pattern, systems for generating moiré-producing pattern, and methods for generating moiré-producing pattern.

BACKGROUND

The term "moiré" refers to interference fringes observed when a plurality of periodic patterns or structures are superimposed on each other. Further, in physical terms, moiré is a beat phenomenon between two spatial frequencies.

Since moiré occurs in various forms, moiré may be removed as being undesirable in some cases, but may be useful in other cases.

For example, PTL 1 discloses "an image forming body having a latent image for producing a moiré image for preventing counterfeiting/duplication, the image forming body including: a substrate; a wavy stripe formed of transverse waves; and a stripe pattern substantially perpendicular to the wavy stripe, the stripe pattern being positioned on a background of the wavy stripe, the wavy stripe and the stripe pattern being provided on the substrate, wherein the wavy stripe forms a relief image, and the stripe pattern is composed of a latent image portion shifted by ½ pitch and a non-latent image portion, which is a portion other than the latent image portion."

Further, PTL 2 discloses a technique that in which pattern generation is performed for generating a complicated pattern such as a marbling pattern by using moiré caused by interference between a display and a camera, using the complicated pattern generated by moiré as art.

[Citation List] [Patent Literature] PTL 1: JP 4403694 B; PTL 2: JP 6218986 B; PTL 3: WO 2020/096009.

SUMMARY OF THE INVENTION

Problem to be Solved by the Invention

In the conventional art, however, there have been no patterns for producing a moiré image with a sense of natural movement and no techniques for creating such patterns.

Some embodiments of the present disclosure have been made in view of such problems, and are directed to provide a moiré display that produces a moiré image with a sense of movement by inputting an input image and data such as a feature value of the input image, a device for generating a moiré-producing pattern, a system for generating a moiré-producing pattern, and a method for generating a moiré-producing pattern.

Solution to Problem

In order to solve the above problems, a moiré display of a representative embodiment of the present disclosure includes: a first pattern; and a second pattern disposed offset from the first pattern by a predetermined distance, the second pattern having a phase which continuously changes relative to the first pattern in at least one region.

The term "continuously change" in the above description refers to changing with a certain tendency in a certain section, and may not necessarily be continuous but may also vary discretely.

In a moiré display of another embodiment, the second pattern has a phase that changes according to a function in at least one section.

In a moiré display of another embodiment, when a reference point is set, and, in coordinates relative to the reference point, a coordinate in a direction perpendicular to moiré fringes is x and a coordinate perpendicular to x is y, a moiré intensity R of the first pattern satisfies the following formula (1), a moiré intensity B of the second pattern satisfies the following formula (2), and a phase shift amount PH representing a change in the phase of the second pattern relative to the first pattern satisfies the following formula (3):

[Math. 1]

$$R(x, y) = 0.5 + 0.5 \times \cos\left(2\pi \times \frac{x\cos a + y\sin a}{P}\right) \quad (1)$$

$$(x, y) = 0.5 + 0.5 \times \cos\left(2\pi \times \frac{x\cos a + y\sin a}{P} + PH(x, y)\right) \quad (2)$$

$$PH(x, y) = k \times 2\pi \times \frac{x\cos a + y\sin a}{P} \quad (3)$$

where α is a stripe angle, P is a stripe pitch, and k is a phase shift coefficient.

In a moiré display of another embodiment, the phase shift coefficient k is represented by a function.

In a moiré display of another embodiment, the phase shift coefficient k continuously changes.

In a moiré display of another embodiment, the phase shift coefficient k satisfies k=x+b, where a and b are constants.

In a moiré display of another embodiment, the phase shift coefficient k changes radially from the reference point.

In a moiré display of another embodiment, a plurality of the reference points exist.

In order to solve the above problems, a device for generating a moiré-producing pattern of a representative embodiment of the present disclosure includes: a reading unit; an extraction unit; and a production unit, wherein the reading unit is configured to obtain an input image on which a moiré-producing pattern is based and moiré information specifying a condition of the moiré-producing pattern, the extraction unit is configured to extract a feature value for each region in the input image, the production unit is configured to generate a first pattern based on the input image and the moiré information, determine a phase shift amount relative to the first pattern according to the feature value for each region in the input image based on the input image and the moiré information, the phase shift amount varying depending on a position in the region for each region, and generate a second pattern disposed offset from the first pattern by a predetermined distance, and generate a moiré-producing pattern composed of the first pattern and the second pattern.

In a device for generating a moiré-producing pattern of another embodiment, the moiré information includes information on a basic configuration of the first pattern and the second pattern and gradation information, and the feature value includes at least one of luminance, saturation, hue, density, transparency, lightness, chromaticity, and grayscale level of an image.

In order to solve the above problems, a system for generating a moiré-producing pattern of a representative embodiment of the present disclosure includes: an information processing server; and at least one client terminal connected to the information processing server via a communication network, the information processing server including a device for generating a moiré-producing pattern, the device for generating a moiré-producing pattern including: a reading unit; an extraction unit; and a production unit, wherein the reading unit is configured to obtain an input image on which a moiré-producing pattern is based and moiré information specifying a condition of the moiré-producing pattern from the at least one client terminal via the communication network, the extraction unit is configured to extract a feature value for each region in the input image, the production unit is configured to generate a first pattern based on the input image and the moiré information, determine a phase shift amount relative to the first pattern according to the feature value for each region in the input image based on the input image and the moiré information, the phase shift amount varying depending on a position in the region for each region, and generate a second pattern disposed offset from the first pattern by a predetermined distance, and generate a moiré-producing pattern composed of the first pattern and the second pattern.

In a system for generating a moiré-producing pattern of another embodiment, the moiré information includes information on a basic configuration of the first pattern and the second pattern and gradation information, and the feature value includes at least one of luminance, saturation, hue, density, transparency, lightness, chromaticity, and grayscale level of an image.

In order to solve the above problems, a method for generating a moiré-producing pattern of a representative embodiment of the present disclosure includes the steps of: generating a first pattern based on an input image and moiré information specifying a condition of the moiré-producing pattern; determining a phase shift amount for each region relative to the first pattern according to the feature value for each region in the input image based on the input image and the moiré information and generating a second pattern disposed offset from the first pattern by a predetermined distance; and obtaining a moiré-producing pattern composed of the first pattern and the second pattern.

In a method for generating a moiré-producing pattern of another embodiment, the moiré information includes information on a basic configuration of the first pattern and the second pattern and gradation information, and the feature value includes at least one of luminance, saturation, hue, density, transparency, lightness, chromaticity, and grayscale level of an image.

Advantageous Effects of the Invention

According to some embodiments of the present disclosure, a moiré image with a sense of movement can be produced by inputting an input image and data such as a feature value of the input image.

Problems, configurations and effects other that those described above will be apparent from the description in the description of the embodiments below.

BRIEF DESCRIPTION OF THE DRAWINGS

FIGS. 7(a)-7(g) are diagrams illustrating a basic patterns (first pattern) of a stripe pattern according to the present disclosure and example patterns (second pattern) in which an aperture/non-aperture ratio is changed.

DETAILED DESCRIPTION

Figure 1:
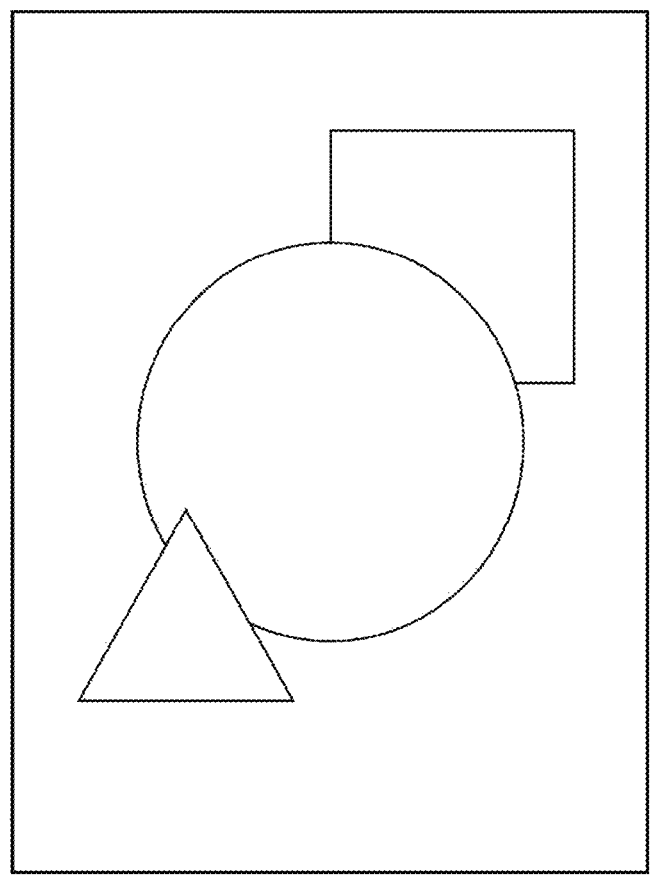
FIG. 1 is a diagram schematically illustrating an input image for which it is desired to create its moiré image according to the present disclosure.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

In the following description, a display that displays a moiré image, and a method and a technique for generating a moiré image-producing pattern will be described.

1 Input Information

FIGS. 1 to 4(c) are diagrams schematically illustrating input information in a system for generating a moiré image-producing pattern. Examples of the input information to the generating system include a feature value of input image (FIG. 1), layer information (FIG. 2), information regarding a moiré display (FIG. 3), and basic pattern information (FIGS. 4(a)-4(c)).

1-1 Input Image and Feature Value

FIG. 1 is a diagram schematically illustrating an example input image for which it is desired to create its moiré image. The term "input image" as used herein refers to image data, such as a design pattern, for which creation of its moiré pattern is desired. FIG. 1 illustrates an input image composed of three parts, and the parts are illustrated as a triangle, a circle, and a rectangle for convenience of illustration. These parts are illustrated with a sense of depth. It should be noted that the input image is not limited to one shown in the figure, and may be any image. The input image may be color or monochrome.

The term "feature value of an input image" as used herein refers to a value related to the input image, such as luminance, saturation, hue, density, transparency, lightness, chromaticity, or grayscale level (grayscale value) of the image. Such a feature value may be provided for each design, part, area, pixel, or block composed of pixels of the input image. Further, a representative value such as an average, median, maximum, or minimum value of each area may be used.

1-2 Layer Information

Figure 2:
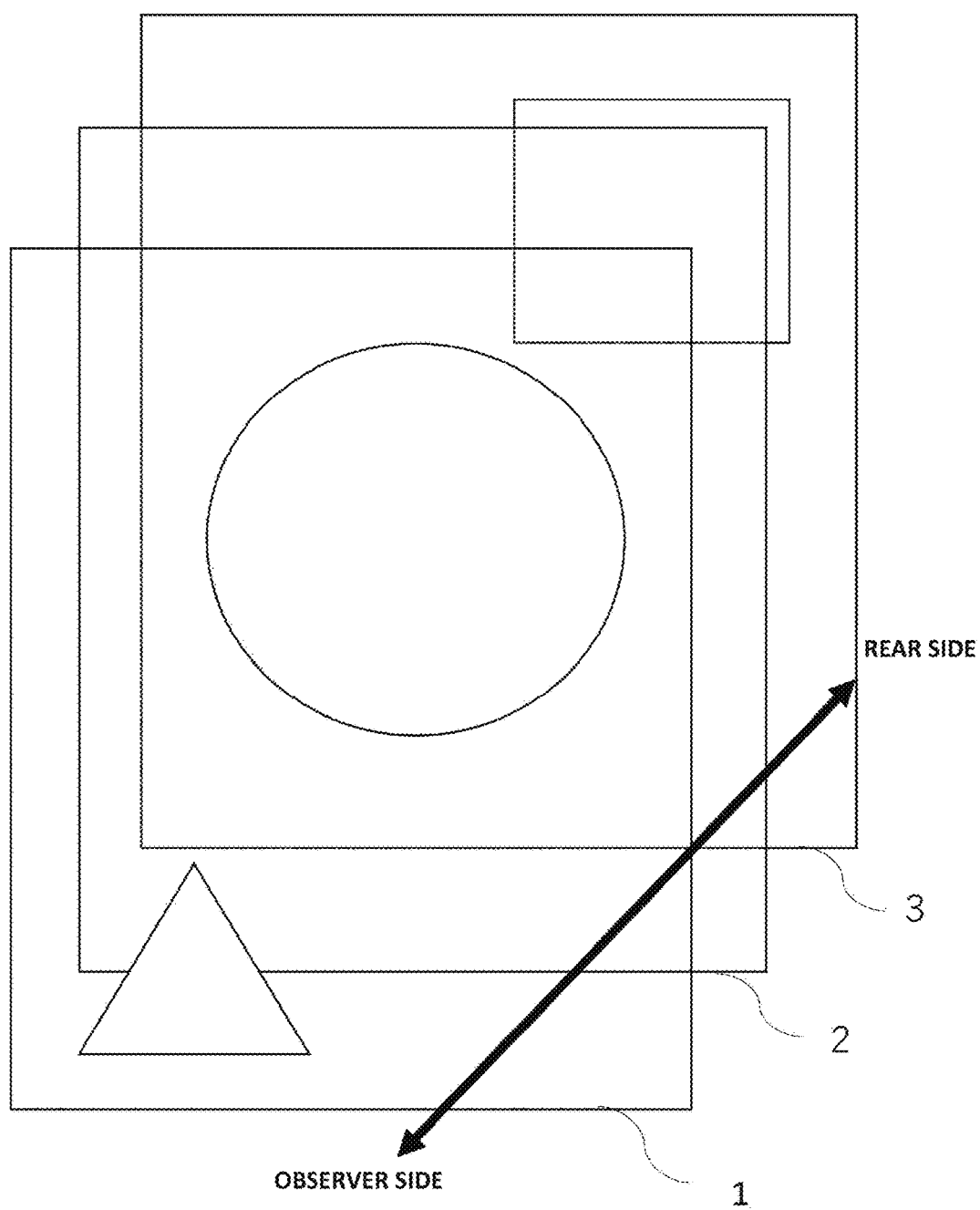
FIG. 2 is a diagram schematically illustrating layer information according to the present disclosure.

FIG. 2 is a diagram schematically illustrating layer information by separating the design pattern of FIG. 1 into individual layers.

The term "layer information" as used herein refers to information specifying a sense of depth of designs or parts of the input image, which can be expressed by numerical values indicating a specific distance in the depth direction or simply by the order of arrangement in the depth direction. The use of this layer information can realize a clear sense of depth in a moiré image. Further, this enhances an immersive feeling to an observer who views a moiré image.

FIG. 2 is a diagram schematically illustrating three parts composed of a triangle, a circle, and a rectangle as three layers (1, 2, and 3). It should be noted that the number of layers is not limited to three, and distances between layers may not always be discrete but may also be continuous. Further, the sense of depth between the layers can be imparted so that they appear to project (emerge) from the moiré display toward the observer or appear to be located on a rear side of the moiré display (recessed from the moiré display) when viewed by the observer.

1-3 Information Regarding Display

Figure 3:
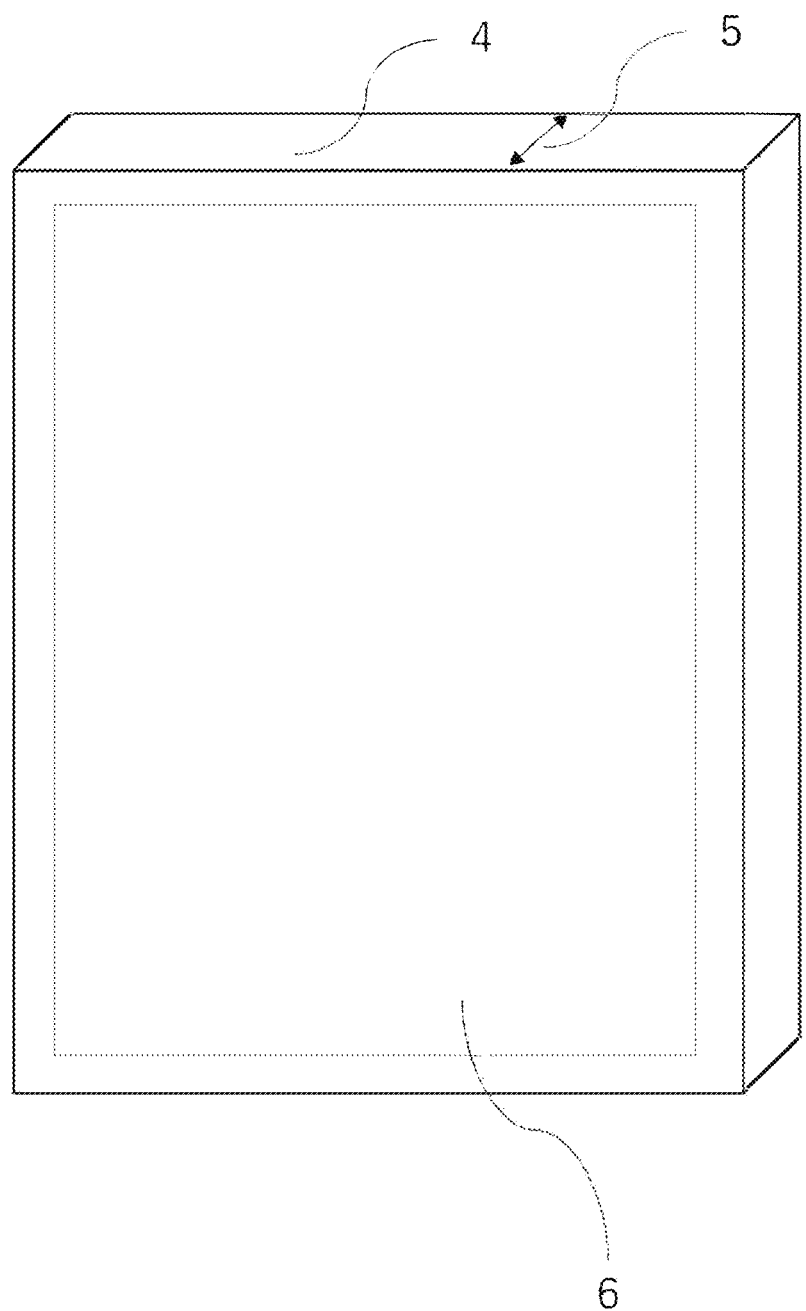
FIG. 3 is a diagram schematically illustrating information regarding a moiré display according to the present disclosure.

FIG. 3 is a diagram schematically illustrating information regarding a moiré display. The term "moiré display" as used herein refers to a display that uses a moiré image, and typically includes posters, panels, POPs, and the like.

Information regarding a moiré display 4 includes a size of a display region 6, a panel thickness 5 (also referred to as a "gap"), a refractive index of a material constituting the panel, and a "viewing distance," which is an average distance from an observer to the display region. Since a stereoscopic moiré is produced by binocular parallax of the observer, information on a positional relationship between the observer and the panel is required for calculation of the parallax. Basically, when the center of the display region 6 coincides with the height of the observer's eyes, the distance between the observer and the panel corresponds to the viewing distance.

Further, when the center of the display region 6 does not coincide with the height of the observer's eyes, or when the height of the position at which a moiré image is produced does not coincide with the height of the observer's eyes, the "viewing distance" can be corrected by the relationship between the position at which moiré is produced and the position of the observer's eyes.

1-4 Basic Pattern Information

The term "basic pattern" as used herein refers to a periodic pattern or structure superimposed to produce moiré.

Figure 4A:
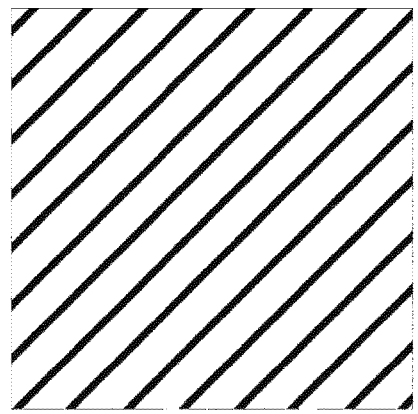
FIGS. 4(a)-4(c) are diagrams illustrating examples of a basic pattern according to the present disclosure.
Figure 4B:
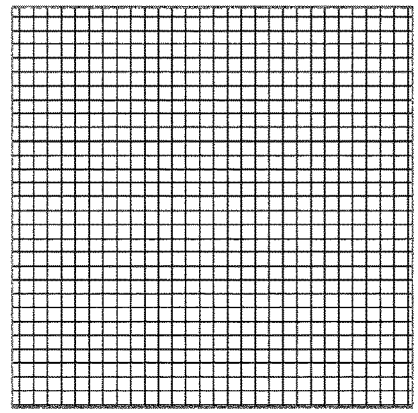
Figure 4C:
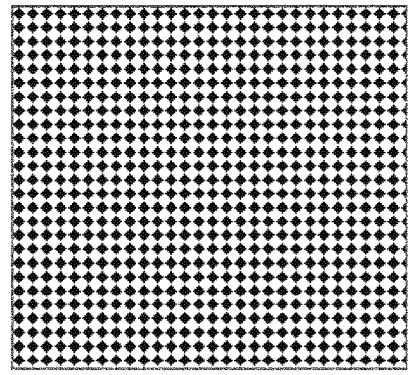

FIGS. 4(a)-4(c) illustrates typical examples of the basic pattern. The basic pattern includes a unidirectional pattern such as a linear pattern (FIG. 4(a)) and a bidirectional pattern such as a grid pattern (FIG. 4(b)) or a check pattern (FIG. 4(c)). The basic pattern is not limited to these examples, and the unidirectional pattern may also be a wavy pattern, a zigzag pattern, or a repetition of characters. Further, the bidirectional pattern may also be a random pattern or characters in addition to a geometrical pattern such as a dot pattern.

In the following description, the basic pattern may also be referred to as a "first pattern." The first pattern is not limited to the basic pattern described above, but may also be a pattern positioned on a rear side.

The term "basic pattern information" as used herein refers to information specifying the shape and properties of the basic pattern described above, such as the shape, line width, pitch, L/S (line & space) ratio, angle, and aperture/non-aperture ratio.

Further, the term "feature value of a pattern" as used herein refers to transmittance, reflectance, optical density, ink density, lightness, grayscale level (grayscale value) or the like. Moreover, the term "aperture/non-aperture ratio" as used herein is a novel concept indicating properties of the pattern, and is different from conventional information such as line width, pitch, and L/S (line & space) ratio. In the following description, the "aperture/non-aperture ratio" will be described.

1-5 Aperture/Non-Aperture Ratio

A pattern is repeated at a regular cycle. Therefore, a feature value of the pattern periodically varies as well. In one cycle of a feature value of the pattern that periodically varies, a portion having high lightness or transparency is referred to as an aperture, and the remaining portion is referred to as a non-aperture. Specifically, a region having a feature value of a predetermined value or more in one cycle may be referred to as an aperture. In determination of the predetermined value, an average value or a median value of the feature value of the entire pattern may be adopted.

Alternatively, normalization using a maximum value and a minimum value may be performed, and an integration ratio may be used.

Furthermore, an FFT (fast Fourier transform) may be used to determine the aperture/non-aperture ratio. In order to obtain a feature value of the pattern, a measurement value from the pattern or a pixel value itself may be used, or an average value or a median value of the peripheral pixels may be used.

In addition, regardless of the above conditions, one or more specific regions in the pattern can be defined as an aperture, a non-aperture, or a region which is neither an aperture nor a non-aperture. The specific region described above refers to, for example, a region corresponding to an image, a character, or a pattern intentionally provided for a design purpose, or a stain or a bare spot that may occur during manufacturing.

In the case of a unidirectional straight line pattern (FIG. 4(a)), a feature value is measured using a cycle of the pattern in a direction perpendicular to the extending direction of the straight lines. In the case of a grid pattern (FIG. 4(b)), a feature value is measured using two directions in which a pattern appears periodically.

Figure 5:
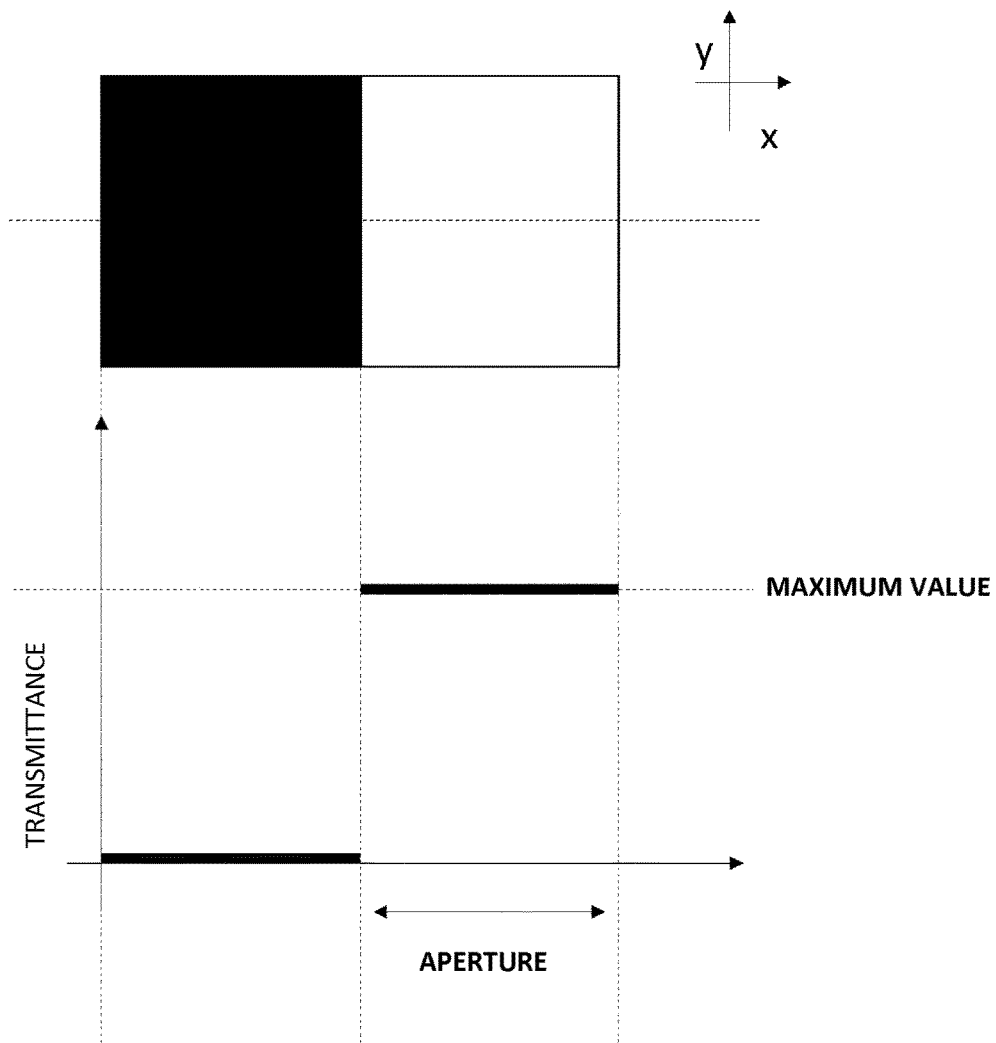
FIG. 5 is a schematic diagram illustrating an example of setting aperture/non-aperture parts by adopting transmittance as a feature value, in which a transmittance value of a rectangular waveform is obtained.

FIG. 5 is a schematic diagram illustrating an example of setting aperture/non-aperture parts by adopting transmittance as a feature value, in which a transmittance value of a rectangular waveform is obtained. In this example, a region showing a maximum transmittance is an aperture, and the other region is a non-aperture.

Figure 6:
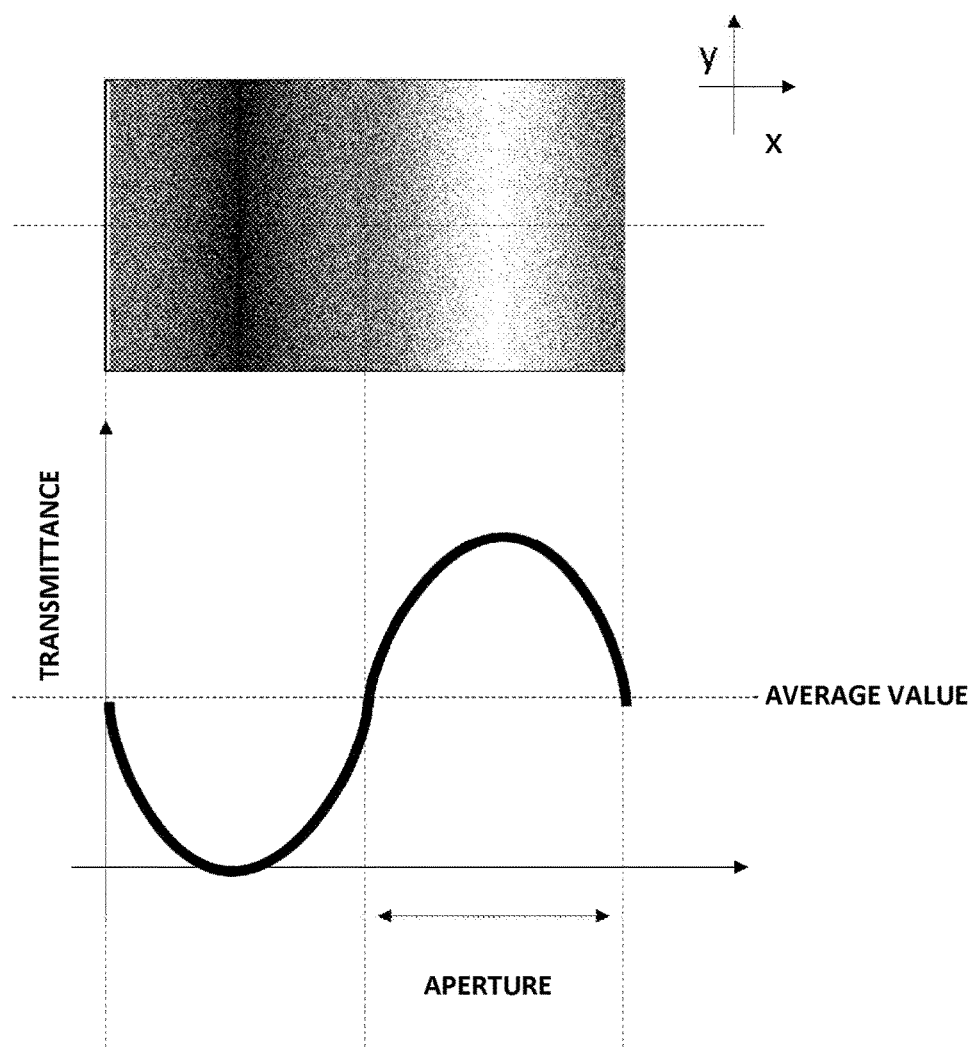
FIG. 6 is a schematic diagram illustrating an example of setting aperture/non-aperture parts by adopting transmittance as a feature value, in which a transmittance value of a sine waveform is obtained.
Figure 7B:
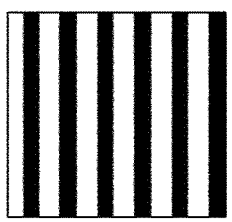
Figure 7C:
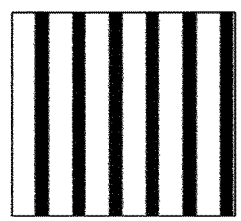
Figure 7D:
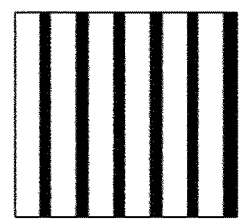
Figure 7E:
Figure 7F:
Figure 7G:
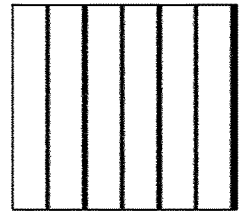

FIG. 6 is a schematic diagram illustrating an example of setting aperture/non-aperture parts by adopting transmittance as a feature value, in which a transmittance value of a sine waveform is obtained. In this example, a region showing an average transmittance or more is an aperture, and the other region is a non-aperture.

1-6 Pitch

The term "pitch" as used herein refers to a distance between the aperture and the non-aperture. The pitch may be measured, for example, between the centers of the aperture and non-aperture, or between the boundaries of the aperture and non-aperture. In other words, the pitch is a distance of one cycle of a pattern repeated at a regular cycle.

As will be described later, the pitch of the pattern contributes to the appearance of moiré which changes as the observer moves. For example, when the pitch is fine (that is, a distance of one cycle is small), the moiré fringes are emphasized, and the apparent overlap is likely to change. Accordingly, an effect in which the pattern appears to be recessed (depth effect) is more recognizable. This change has an influence on the relationship between the front side pattern and the rear side pattern.

The pitch is basically measured in a direction in which the pattern is scanned (that is, a direction in which the aperture and non-aperture are repeated). For example, for a striped pattern, the pattern is repeated in a direction perpendicular to the extending direction of the straight lines. Accordingly, a pitch is measured in a direction perpendicular to the extending direction of the straight lines.

Similarly, when the aperture and non-aperture are formed of straight lines, which are repeated to form a pattern, the pitch is measured in a direction in which the pattern is repeated (a direction perpendicular to the extending direction of the curved lines). Further, when the aperture and non-aperture in the pattern are repeated in a plurality of directions (for example, a check pattern or the like), the pitch can be measured in respective directions or measured only in one direction.

In the above description, the pitch in a regular pattern such as stripes and checks is described as an example. However, the pitch described in the present disclosure can be measured, not only for vertical or horizontal stripes, checks, and the like, but also for a pattern with a different angle (for example, obliquely arranged stripes), an irregular pattern (for example, unevenness caused by printing error), a pattern with an irregular pitch (for example, a pitch varying in a pattern), a pattern with different colors, or the like. When the pitch, angle, color, or the like is different in the same image, a pitch may be calculated for each component (layer, region, or the like) of the image.

Further, even when the pitch is the same, the extending direction of the pattern (for example, the direction of straight lines of stripes) may contribute to a change in the appearance of the moiré. For example, the rate at which the moiré changes relative to the movement direction of the observer may vary depending on the angle of the pattern.

As one specific example of this phenomenon, it is assumed that a pattern having stripes vertically arranged and a pattern having stripes obliquely arranged at 45 degrees have the same pitch. When the observer moves transversely relative to these patterns, the observer may feel that the change in appearance of moiré is slower in the moiré produced by the pattern having stripes obliquely arranged at 45 degrees compared with the moiré produced by the pattern having stripes vertically arranged.

The reason for this is, when the pattern is scanned in the viewing direction of the observer, the pattern having stripes arranged at 45 degrees appears as if it has a wider pitch than the pattern having stripes vertically arranged. Accordingly, the rate of the change in appearance of the moiré relative to the movement of the observer can be controlled by adjusting the extending direction of the pattern, which can improve the design of the moiré.

2 Output Pattern

A moiré-producing pattern of the pattern generating system according to the present invention is composed of a first pattern (front side pattern) and a second pattern (rear side pattern).

A moiré-producing pattern for producing a moiré image is provided on the premise that the first pattern and the second pattern are superimposed on each other, and a pattern positioned on a side closer to the observer is referred to as a front side pattern, and a pattern positioned on a side farther from the observer is referred to as a rear side pattern.

4 Characteristics of Moiré Appearance

Due to the difference in pitch and aperture/non-aperture ratio between the first pattern (front side) and the second pattern (rear side), and a gap existing between the first pattern (front side) and the second pattern (rear side), the moiré has the following composite effects.

4-1 Moiré Intensity

The moiré intensity tends to increase as the aperture/non-aperture ratio of the first pattern (front side) and the second pattern (rear side) approaches 1.

4-2 Apparent Density

The term "Apparent density" as used herein refers to a degree of apparent density due to the difference in aperture/ non-aperture ratio between the first pattern (front side) and the first pattern (rear side). As the aperture/non-aperture ratio of the pattern increases, the pattern and moiré tend to appear lighter.

4-3 Variation Amount of Moiré

The phase of moiré varies depending on the position (angle) of the observer since the first pattern (front side) and the second pattern (rear side) are superimposed on each other with a gap therebetween. As the aperture/non-aperture ratio increases, the moiré tends to remain light, and as the aperture/non-aperture ratio decreases, the moiré tends to remain dark (that is, there is little change). Furthermore, as the aperture/non-aperture ratio approaches 1, the variation amount of the moiré tends to increase.

5 Evaluation of Moiré Appearance

In evaluation of moiré appearance, the above effects and the like are collectively observed. Further, in addition to these effects, the characteristics of moiré appearance may be evaluated from the viewpoint of "moiré stability," which indicates the degree to which the moiré image is recognized even when the viewing distance is larger than the expected distance.

In the present invention, the moiré appearance is evaluated focusing on the aperture/non-aperture ratio of the pattern to comprehensively determine the suitability of moiré when it is used as a design. The determination is specifically performed by comparison or grade evaluation such as using 3 levels (i.e., good, fair, and poor).

In addition to the overall evaluation, evaluation of degree of lightness/darkness of the appearance of moiré image, degree of mobility of moiré image, and the like may be additionally performed (the evaluation may or may not be performed since what is regarded as important is different depending on the design that is desired to be expressed).

Further, in the present invention, when the first pattern (front side) and the second pattern (rear side) are generated from the input image, the aperture/non-aperture ratio is selected considering the results of the appearance evaluation.

In general, the appearance of the moiré or the like varies depending on the pattern used, configuration of image, viewing conditions, and the like. Accordingly, it is desired to evaluate each of the specific attributes in addition to the overall appearance evaluation. Therefore, in the present disclosure, the following attributes are also evaluated.

5-1 Degree of Lightness/Darkness of the Moiré Image

The "degree of lightness/darkness of the moiré image" refers to the evaluation of apparent lightness (light/dark, density) of moiré appearance. The degree of lightness/ darkness of the moiré image varies mainly due to the composite effects of the moiré intensity and the apparent density. The evaluation is made by comparison or grade evaluation such as using 11 levels (dark: $-5, -4, \ldots, 4, 5$: light).

5-2 Degree of Mobility of Moiré Image

The "degree of mobility of moiré image" refers to the evaluation of moiré appearance for movement or flickering of the moiré image. The degree of mobility of the moiré image varies mainly due to the composite effects of the moiré intensity and the moiré mobility. The evaluation is made by comparison or grade evaluation such as using 6 levels (low: 0, 1, . . . , 4, 5: high).

6 Examples of Moiré-Producing Pattern Generation

In the following description, a method and a system for generating a moiré-producing pattern according to an input image of the example will be described by taking an example of the case using a stripe pattern. In the present embodiment, a pattern in which the moiré fringes appear to move as the observer moves is generated.

In the present example, the phase of the second pattern is changed relative to the phase of the first pattern so that the moiré fringes appear to move.

6-1 Basic Pattern and Variation Pattern

FIGS. 7(a)-7(g) is a are diagrams illustrating a basic pattern (first pattern) of a stripe pattern according to the present example and example patterns (second pattern) in which an aperture/non-aperture ratio is changed.

The basic pattern (a) (first pattern) has an aperture/non-aperture ratio of 1.0, and (b) to (g) are patterns (second pattern) having different aperture/non-aperture ratios from 1.5 to 9.0.

6-2 Examples of Input Image

Figure 8:
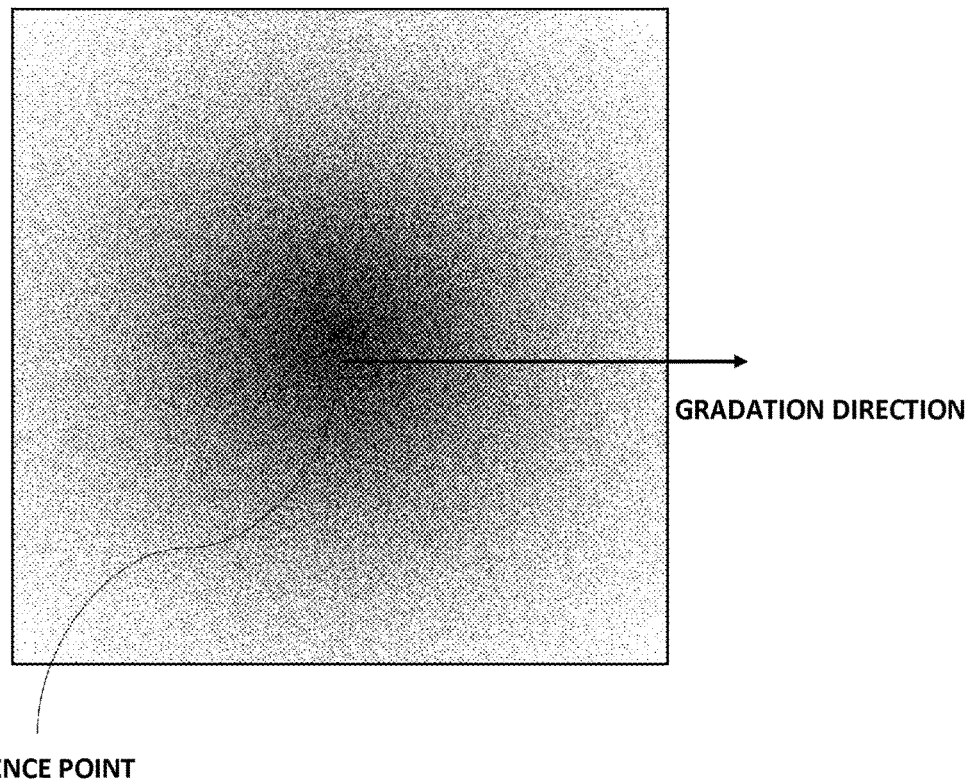
FIG. 8 is a diagram illustrating an example of an input image according to the present disclosure.

FIG. 8 is a diagram illustrating an example of the input image according to the present example. The input image in FIG. 8 has a gradation in the radial direction with the center of the concentric circles as a reference point. The reference point may be set at a position other than the center. This gradation becomes a feature value of the input image. A black portion of the input image with low luminance has a small amount of phase shift, and a white portion of the input image with high luminance has a large amount of phase shift. The amount of phase shift is continuous between the black portion and the white portion. As the overlap between the first pattern and the second pattern moves, the moiré fringes appear to move radially.

6-3 Selection of Phase Shift Amount of Pattern According to Feature Value of Input Image The procedure for generating a moiré-producing pattern includes: 1) specifying a region where the phase shift amount of the pattern is changed; and 2) setting a phase shift amount of the pattern according to the feature value of the pattern. The phase shift amount refers to the amount of phase shift of the second pattern relative to the first pattern, and in the present example, the phase shift amount is determined using the gray scale luminance so that it continuously changes in at least one region. The term "continuously change" as used herein refers to that the change can be represented by a continuous function in at least one section. The continuous function may not necessarily be a function that varies continuously, but may also be a function that varies discretely with a certain tendency. Examples of the continuous function will be described later.

First, 1) a region where the phase shift amount of the pattern is changed is specified. The simplest way to perform this step is to specify the region according to the contour of the input image. However, the region is not necessarily specified by the contour of the image, and may be appropriately set according to the situation in which the moiré display 4 is used.

In the present example, for the purpose of simplification of the description, FIG. 8 shows the rectangle as the region where the phase shift amount is changed.

Then, 2) in setting of the phase shift amount of the pattern according to the feature value of the pattern, the phase shift amount is selected within the region in view of the distance from the reference point in the direction perpendicular to the moiré fringes.

6-4 Phase Shift Amount

In the present example, when a reference point is set, and, in the coordinates relative to the reference point, the coordinate in a direction perpendicular to the moiré fringes is x and the coordinate perpendicular to x is y, the moiré intensity R of the first pattern satisfies the following formula (1):

[Math. 2]

$$R(x, y) = 0.5 + 0.5 \times \cos\left(2\pi \times \frac{x\cos\alpha + y\sin\alpha}{P}\right) \quad (1)$$

where α is the stripe angle and P is the stripe pitch.

Further, the moiré intensity B of the second pattern satisfies the following formula (2):

[Math. 3]

$$B(x, y) = 0.5 + 0.5 \times \cos\left(2\pi \times \frac{x\cos\alpha + y\sin\alpha}{P} + PH(x, y)\right) \quad (2)$$

where α is the stripe angle and P is the stripe pitch.

The phase in cos in formula (2) of the second pattern is shifted by PH (x, y) compared with the first pattern. A phase shift amount PH indicating this phase shift satisfies the following formula (3):

[Math. 4]

$$PH(x, y) = k \times 2\pi \times \frac{x\cos\alpha + y\sin\alpha}{P} \quad (3)$$

where α is a stripe angle, P is a stripe pitch, and k is a phase shift coefficient.

From formula (3), the state of moiré can be known from the phase shift coefficient k as shown in Table 1 below.

TABLE 1

| Phase shift coefficient | Comparison with phase of stripe pattern | Pattern and moiré |
|---|---|---|
| k = 1 | Same | Same shift as pitch moiré fringe luminance is maximum (white) |
| k = 1, 2, 3 . . . , n (integer) | Same (0 or even multiple) | Same shift as pitch or shifted by n pitch moiré fringe luminance is maximum (white) |
| k = 1/2, 3/2, 5/2 . . . , (2n + 1)/2 | 1/2 (odd multiple) | Shifted by 1/2 of pitch moiré fringe luminance is minimum (black) |

TABLE 1-continued

| Phase shift coefficient | Comparison with phase of stripe pattern | Pattern and moiré |
|---|---|---|
| k = 1/4, 5/4, 9/4 . . . , (4n + 1)/4 | 1/4 | Shifted by 1/4 of pitch moiré fringe luminance is minimum (gray) |
| k = 3/4, 7/4, 11/4 . . . , (4n + 3)/4 | 3/4 | Shifted by 3/4 of pitch moiré fringe luminance is minimum (gray) |

Figure 9:
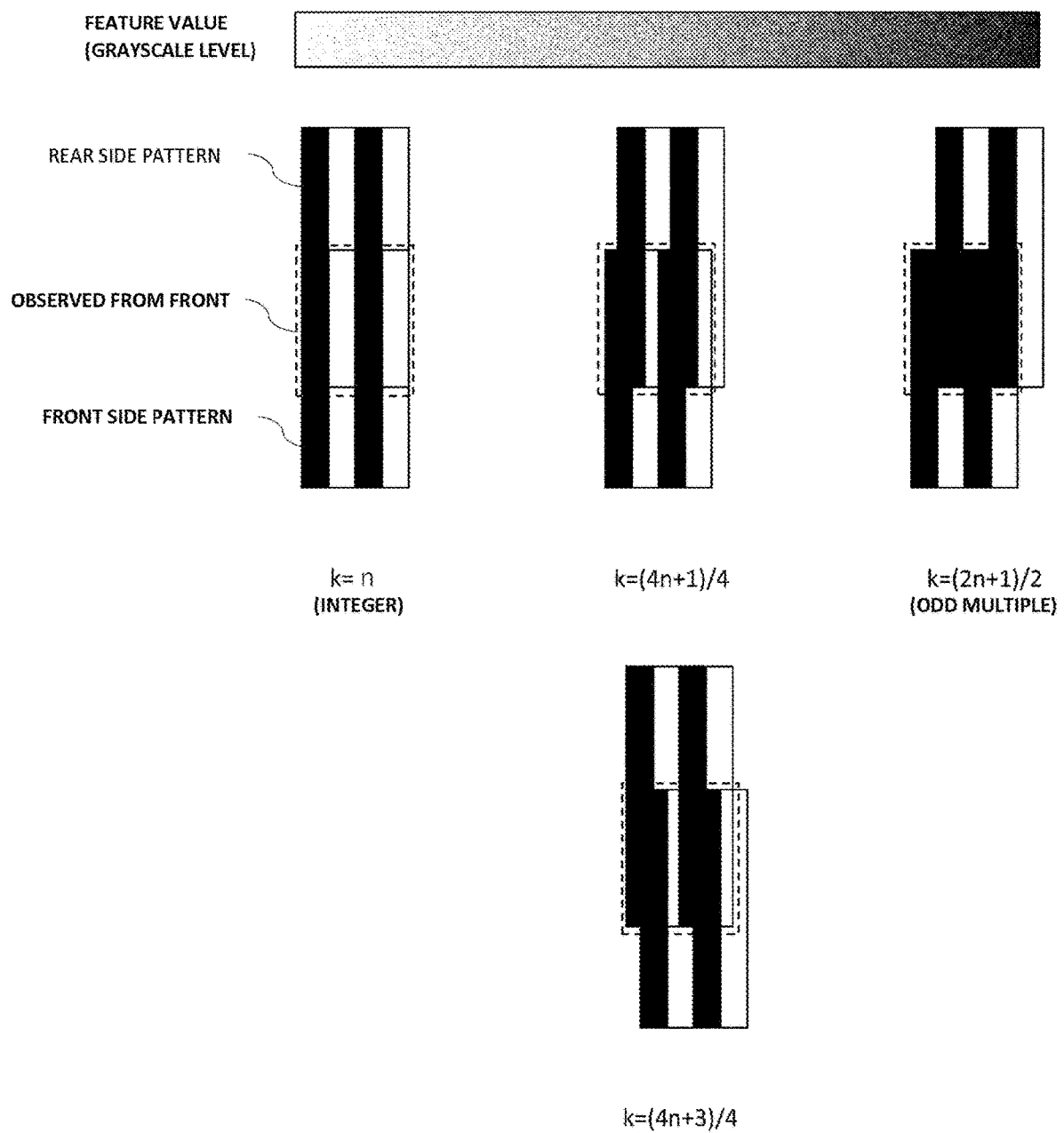
FIG. 9 is a diagram illustrating images of phase shift amount corresponding to a phase shift coefficient according to the present disclosure.

FIG. 9 is a diagram illustrating images of the phase shift amount corresponding to the phase shift coefficient. The views in FIG. 9 correspond to the contents of Table 1. In FIG. 9, the phase of the front side pattern is shifted relative to that of the rear side pattern. The state of observation from the front corresponds to the grayscale level.

6-5 Changes in Phase Shift Coefficient

Figure 10A:
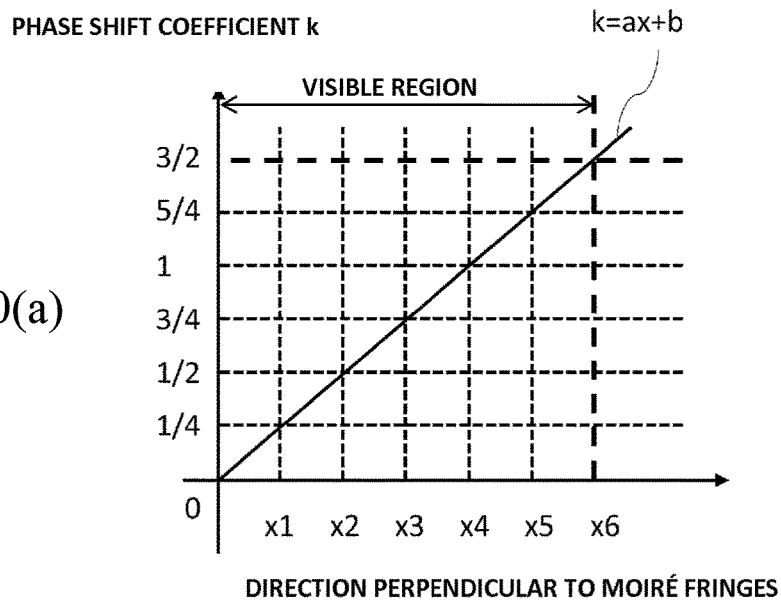
FIGS. 10(a)-10(b) show changes in moiré fringe luminance relative to changes in phase shift coefficient of the present disclosure.
Figure 10B:
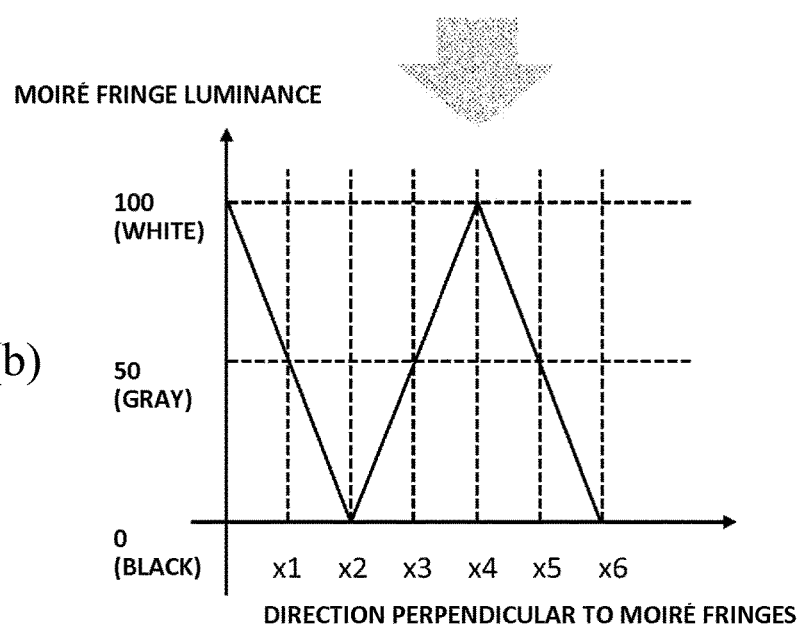

FIGS. 10(a)-10(b) shows changes in moiré fringe luminance relative to changes in phase shift coefficient k of the present example.

FIG. 10(a) shows the relationship between the position in a direction perpendicular to the moiré fringes and the value of the phase shift coefficient k, and FIG. 10(b) shows the relationship between the position in a direction perpendicular to the moiré fringes and the luminance of the moiré fringes.

The origin 0 is a reference point that serves as a reference for determining the phase shift amount, and in the present example, corresponds to the center point of the input image. Further, the direction perpendicular to the moiré fringes, which is a direction perpendicular to the stripes, is a direction in which the phase shift amount varies with the reference point as the origin.

As shown in FIG. 10(a), when the direction perpendicular to the moiré fringes is x and the phase shift coefficient is k, the phase shift coefficient of the present example can be expressed as k=ax+b. When the phase shift coefficient k increases linearly, the luminance of the moiré fringes changes periodically as shown in FIG. 10(b).

In the present example, in which the input image has a concentric shape, the phase shift amount is equal in any radial direction when the reference point is set at the center of the concentric circles. However, the phase shift amount may be different depending on the direction.

6-6 Definition of Visible Region

Figure 11A:
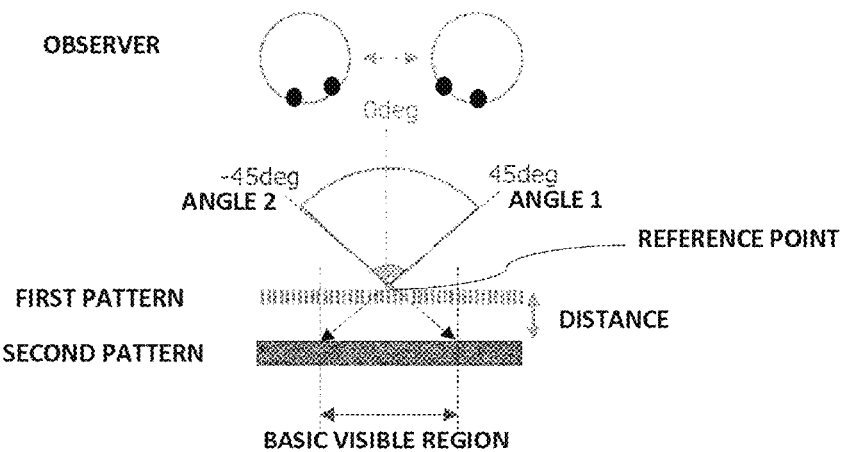
FIGS. 11(a)-11(b) are diagrams showing the definition of a visible region of moiré fringes according to the present disclosure.
Figure 11B:
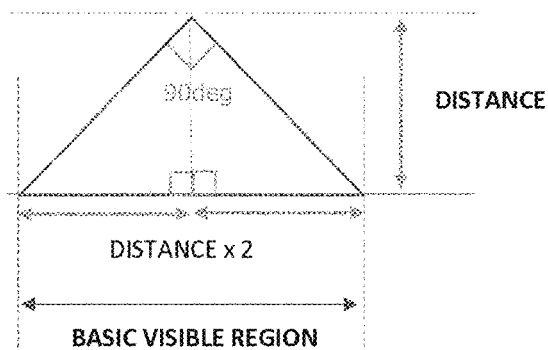

FIGS. 11(a)-11(b) are diagrams showing the definition of a visible region of moiré fringes of the present example.

FIG. 11(a) shows the relationship between an observer and the first and second patterns in the present example. FIG. 11(b) shows calculation of a basic visible region in the present example.

As shown in FIG. 11(a), as the observer moves in the present example, the apparent overlap between the first pattern and the second pattern shifts, whereby the moiré fringes appear to move. In order to set the phase shift amount between the first pattern and the second pattern, it is necessary to define the visible region observed by the observer.

First, when a reference point is set and observation is performed in a range between an angle 1 and an angle 2 relative to the reference point, a region of the second pattern that can be seen through the first pattern is set as a basic visible region. The angle 1 and the angle 2 of the present example are 45 deg and −45 deg, respectively, with the angle relative to the front of the first and second patterns as 0 deg. Further, the angle 1 and the angle 2 are angles in a direction perpendicular to the stripe patterns.

In this case, as shown in FIG. 11(b), in relation to the distance between the first pattern and the second pattern and the angles, an isosceles right triangle is formed by the basic visible region. Therefore, the basic visible region is equal to the distance between the first pattern and the second pattern× 2. The visible region is defined as the basic visible region multiplied by the pitch of the first pattern.

6-7 Gradient of Phase Shift Coefficient

In the present example, when obtaining the phase shift coefficient k=ax+b in the visible region in a direction perpendicular to the moiré fringes, it is necessary to set a and b. When a satisfies $0 < a \leq 20$, the moiré fringes appears to move. Preferably, $0.5 \leq a \leq 8$ is satisfied. Note that b may be any value.

6-8 Moiré Image

Figure 12:
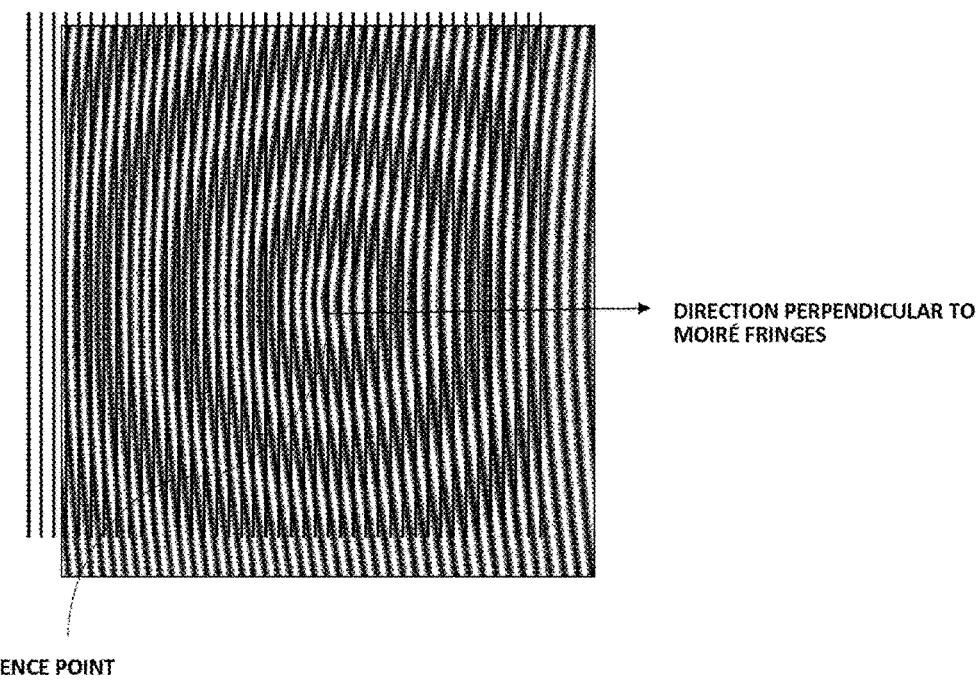
FIG. 12 illustrates moiré fringes created for the input image shown in FIG. 8 according to the present disclosure.

FIG. 12 illustrates moiré fringes created for the input image shown in FIG. 8.

When the input image shown in FIG. 8 in which a gradation is formed in the radial direction from the reference point is input, the first pattern and the second pattern are formed. When the first pattern and the second pattern are disposed with a predetermined distance therebetween and observed in the visible region, concentric moiré fringes are formed around the reference point as shown in FIG. 12. The moiré fringes are continuously formed, and appear to move as the observer moves.

7 Other Input Image Examples

Figure 13A:
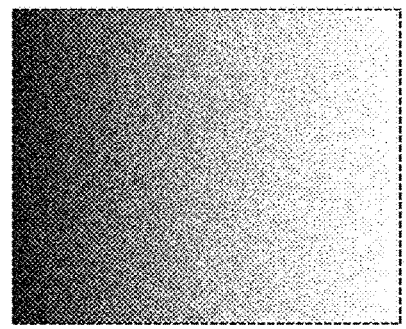
FIGS. 13(a)-13(c) illustrate other examples of an input image according to the present disclosure.
Figure 13B:
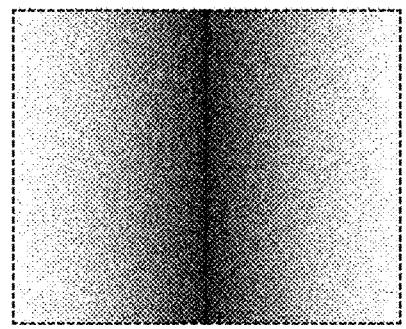
Figure 13C:
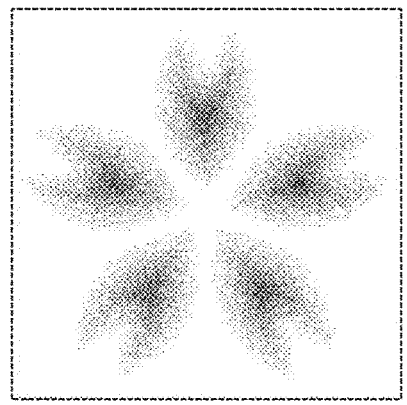

FIGS. 13(a)-13(c) illustrates other examples of the input image. FIG. 13(a) shows an example in which a gradation is formed in the horizontal direction, FIG. 13(b) shows an example in which gradations are formed from the center to both ends on the left and right sides, and FIG. 13(c) shows an example in which a plurality of gradation regions are formed in the radial direction.

In the example of FIG. 13(a), the moiré fringes appear to move from left to right or right to left as with the direction of the gradation. In the example of FIG. 13(b), the moiré fringes appear to move from the center to the left and right sides or from the left and right sides to the center as with the direction of the gradation. In the example of FIG. 13(c), the moiré fringes appear to move in the regions where the gradation is formed.

7-1 Phase Shift Coefficient and Moiré Movement

Figure 14A:
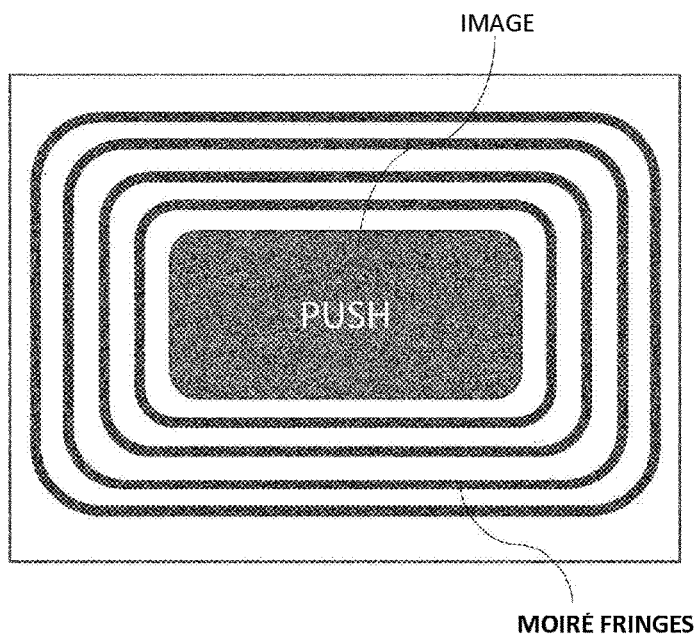
FIGS. 14(a)-14(b) are diagrams illustrating an example of moiré fringes when a phase shift coefficient k of the present disclosure changes monotonically.
Figure 14B:
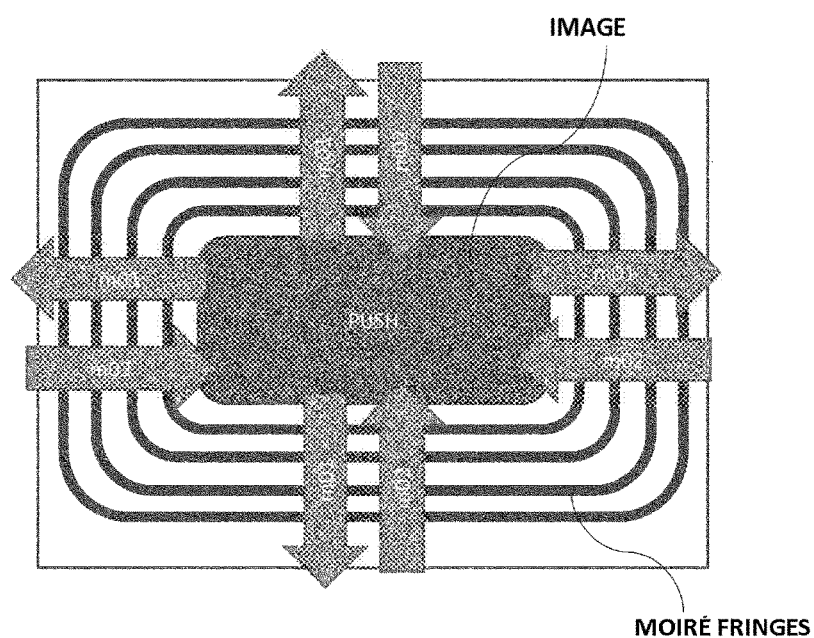

FIGS. 14(a)-14(c) is a are diagrams illustrating an example of moiré fringes when the phase shift coefficient k of the present example changes monotonically. FIG. 14(a) illustrates the moiré fringes when the phase shift coefficient k of the present example changes monotonically. FIG. 14(b) illustrates movement of the moiré fringes when the phase shift coefficient k of the present example changes monotonically.

In the examples shown in FIG. 14(a)-14(b), the moiré fringes are continuously formed with the image "PUSH" as the center. As shown in FIG. 10(a), when the phase shift coefficient increases or decreases monotonically at k=ax+b or the like, the moiré fringes are formed at regular intervals as shown in FIG. 14(*a*). With the moiré fringes thus formed, the image can be effectively enhanced.

As the observer moves, the moiré fringes appear to move in the direction of an arrow m01 or an arrow m02 as shown in FIG. 14(*b*). The direction in which the moiré fringes move is switched according to the direction in which the observer moves. Due to the movement of the moiré fringes, the center image "PUSH" is further enhanced, attracting attention of the observer. Note that the center position of the moiré fringes can be changed.

7-2 Changes in Other Phase Shift Coefficients

Figure 15A:
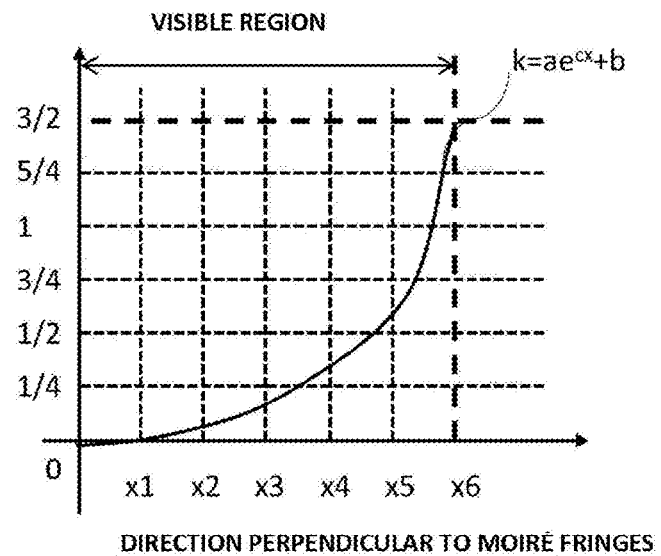
FIGS. 15(a)-15(b) show examples in which a phase shift coefficient k according to the present disclosure changes exponentially.
Figure 15B:
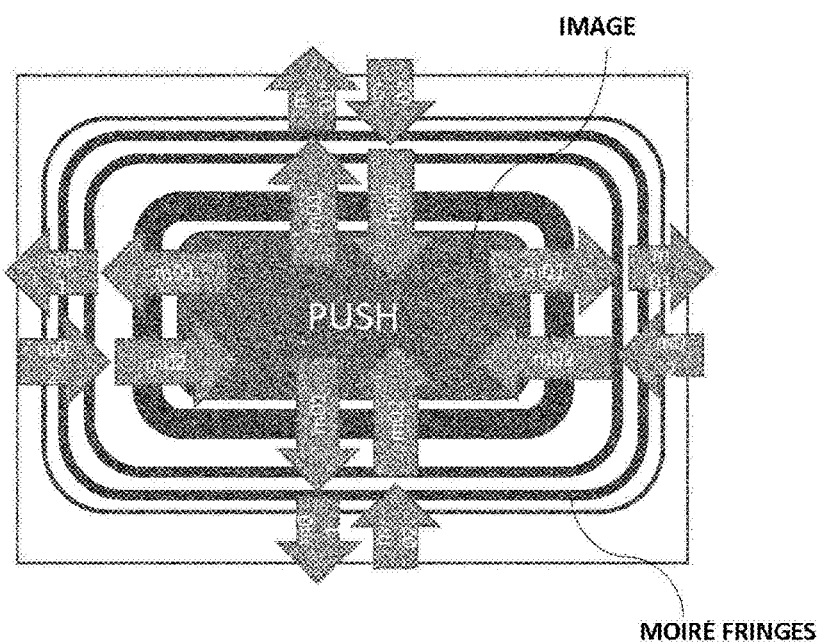

FIGS. 15(*a*)-15(*b*) shows an examples in which the phase shift coefficient k of the present example changes exponentially. FIG. 15(*a*) shows changes in moiré fringe luminance when the phase shift coefficient k of the present example changes exponentially. FIG. 15(*b*) shows the movement of the moiré fringes.

The phase shift coefficient k may change by an exponential function $k=ae^{cx}+b$ as shown in FIG. 15(*a*). The moiré fringes shown in FIGS. 14(*a*)-14(*b*) move monotonically and have little change. On the other hand, when the phase shift coefficient k changes by the exponential function $k=ae^{cx}+b$ shown in FIG. 15(*a*), the moiré fringes are formed at different intervals determined by the exponential function as shown in FIG. 15(*b*). As the observer moves, the moiré fringes appear to move at varied speeds. Therefore, the observer can more clearly recognize the movement of moiré fringes.

Further, the exponential change in the phase shift coefficient k can provide a visual effect depending on the position where the moiré fringes are formed and the positional relationship with other images. For example, as shown in FIG. 15(*b*), the exponential change in the phase shift coefficient k in the contour portion of the figure can provide a visual effect such as embossing.

When the exponential function $k=ae^{cx}+b$ satisfies 0<a and 0<c, the movement of moiré fringes can be clearly recognized. Preferably, when 1≤a≤50 and 0.001≤c≤3 are satisfied, the movement of moiré fringes can be further clearly recognized. Note that b may be any value.

Figure 16A:
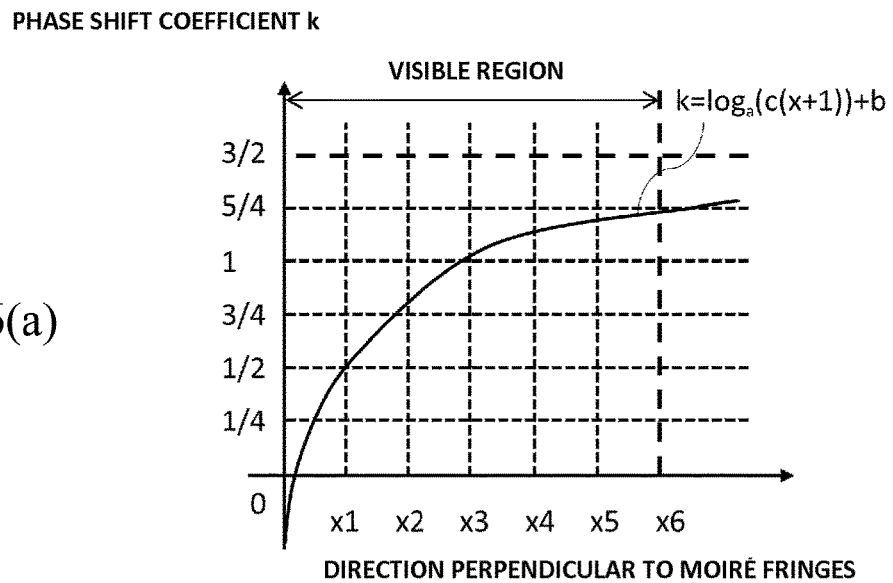
FIGS. 16(a)-16(b) show examples in which a phase shift coefficient k according to the present disclosure changes logarithmically.
Figure 16B:
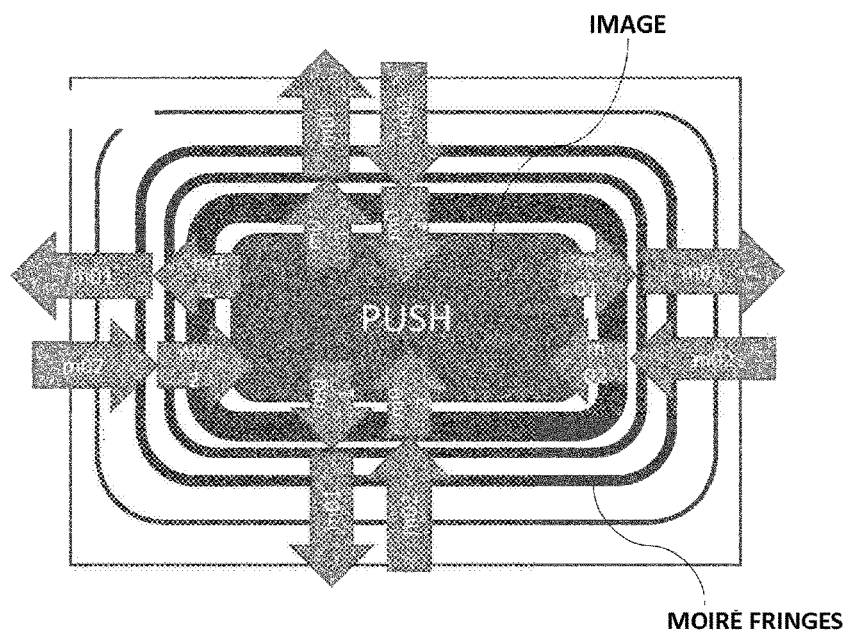

FIGS. 16(*a*)-16(*b*) shows an examples in which the phase shift coefficient k of the present example changes logarithmically. FIG. 16(*a*) shows changes in moiré fringe luminance when the phase shift coefficient k of the present example changes logarithmically. FIG. 16(*b*) shows the movement of the moiré fringes.

The phase shift coefficient k may change by a logarithmic function $k=\log_a(c(x+1))+b$ as shown in FIG. 16(*a*). When the phase shift coefficient k changes by the logarithmic function $k=\log_a(c(x+1))+b$ shown in FIG. 16(*a*), the moiré fringes are formed at different intervals determined by the logarithmic function as shown in FIG. 16(*b*). As the observer moves, the moiré fringes appear to move at varied speeds. Therefore, the observer can more clearly recognize the movement of moiré fringes.

Further, the logarithmical change in the phase shift coefficient k can provide a visual effect depending on the position where the moiré fringes are formed and the positional relationship with other images. For example, as shown in FIG. 16(*b*), the logarithmical change in the phase shift coefficient k in the contour portion of the figure can provide a visual effect such as embossing.

When the logarithmic function $k=\log_a(c(x+1))+b$ satisfies 1<a and 0<c, the movement of moiré fringes can be clearly recognized. Preferably, when 1<a≤105 and 1≤c≤1010 are satisfied, the movement of moiré fringes can be further clearly recognized. Note that b may be any value.

Figure 17A:
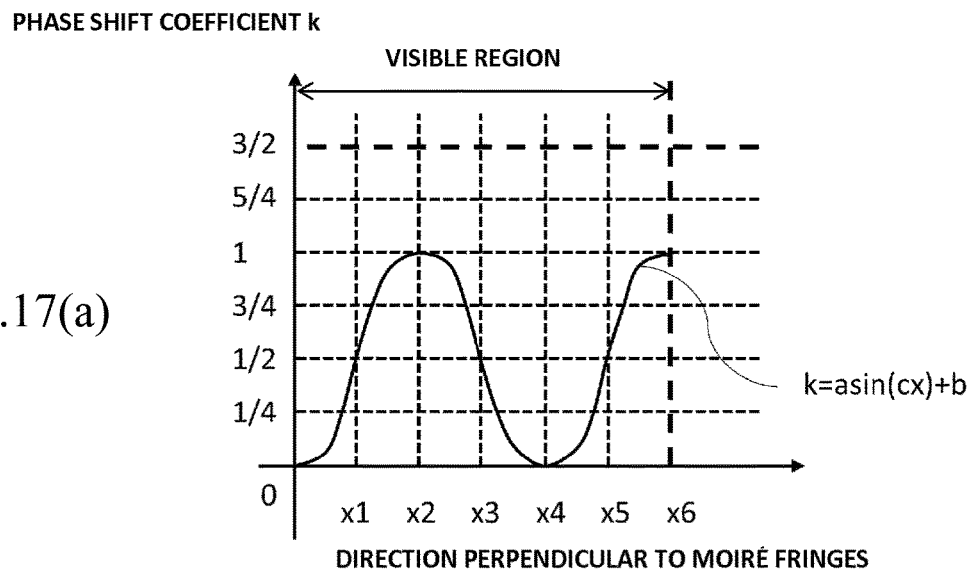
FIGS. 17(a)-17(b) shows an example in which a phase shift coefficient k according to the present disclosure changes trigonometrically.
Figure 17B:
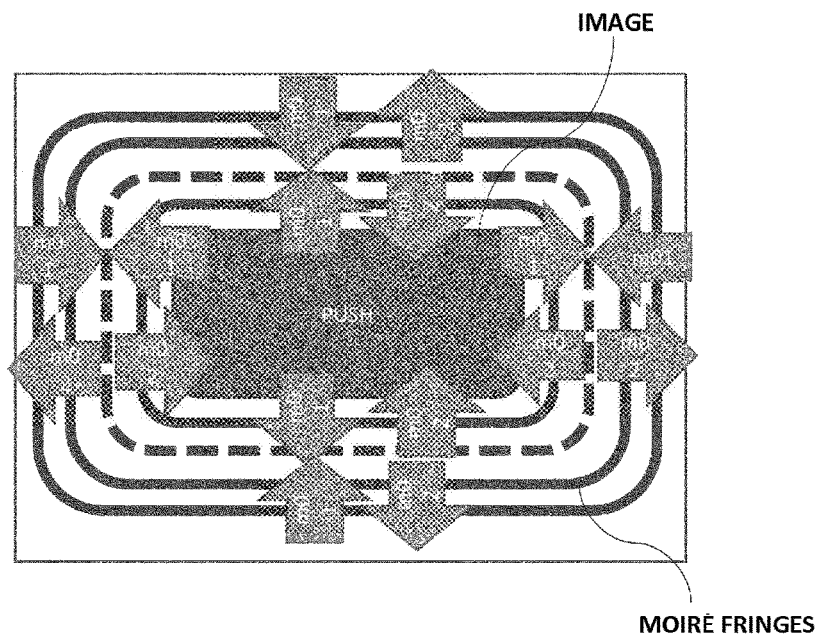

FIGS. 17(*a*)-17(*b*) shows an examples in which the phase shift coefficient k of the present example changes trigonometrically. FIG. 17(*a*) shows changes in moiré fringe luminance when the phase shift coefficient k of the present example changes trigonometrically. FIG. 17(*b*) shows the movement of the moiré fringes.

The phase shift coefficient k may change by a trigonometric function $k=a\sin(cx)+b$ as shown in FIG. 17(*a*). When the phase shift coefficient k changes by the trigonometric function $k=a\sin(x)+b$ shown in FIG. 17(*a*), the moiré fringes are formed at intervals determined by the trigonometric function as shown in FIG. 17(*b*). As the observer moves, the moiré fringes appear to move in a reverse direction in the vicinity of the phase shift amount k=0. Therefore, the observer can effectively recognize the movement of complicated moiré fringes. Further, the portions of the moiré fringes where they appear to move in a reverse direction can be smoothly connected.

Further, the trigonometrical change in the phase shift coefficient k can provide a visual effect depending on the position where the moiré fringes are formed and the positional relationship with other images. For example, as shown in FIG. 17(*b*), the trigonometrical change in the phase shift coefficient k in the contour portion of the figure can provide a visual effect such as embossing.

When the trigonometric function $k=a\sin(cx)+b$ satisfies 0<a and 0<c, the movement of moiré fringes can be clearly recognized. Preferably, when 1≤a≤20 and 1≤c≤3 are satisfied, the movement of moiré fringes can be further clearly recognized. Note that b may be any value. Further, although a sine wave is used in the present example, a cosine wave $k=a\cos(cx)+b$ may be used instead.

Figure 18:
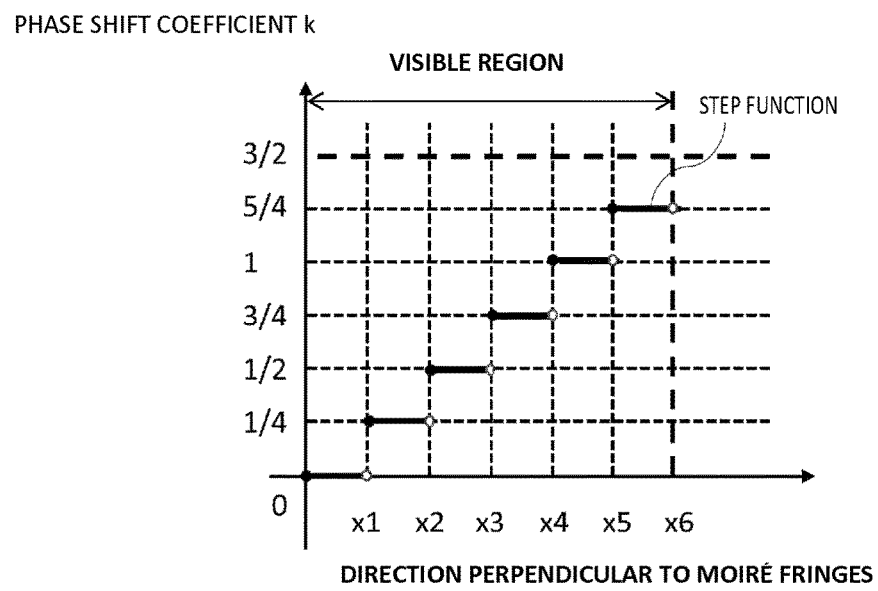
FIG. 18 shows an example in which a phase shift coefficient k according to the present disclosure changes according to a step function.

FIG. 18 shows an example in which the phase shift coefficient k of the present example changes according to a step function.

The phase shift coefficient k may change by a step function as shown in FIG. 18. The step function shown in FIG. 18 increases stepwise within the visible region. The step function may decrease stepwise or may increase and decrease stepwise within the visible region. As the observer moves, the moiré fringes appear to move stepwise. Therefore, the observer can effectively recognize a slightly unnatural movement of moiré fringes.

Figure 19:
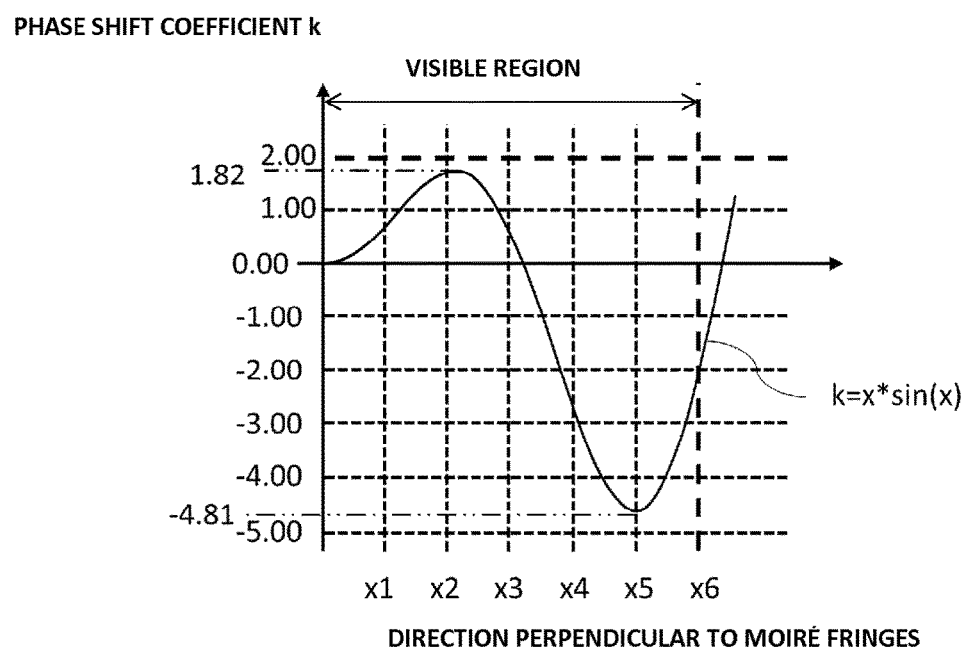
FIG. 19 shows an example in which a phase shift coefficient k according to the present disclosure changes according to a composite function.

FIG. 19 shows an example in which the phase shift coefficient k of the present example changes according to a composite function.

The phase shift coefficient k may change by a composite function $k=x*\sin(x)$ as shown in FIG. 19. The composite function $k=x*\sin(x)$ shown in FIG. 19 smoothly increases and decreases within the visible region. As the observer moves, the moiré fringes appear to move smoothly and irregularly. Therefore, the observer can effectively recognize the movement of moiré fringes.

Figure 20A:
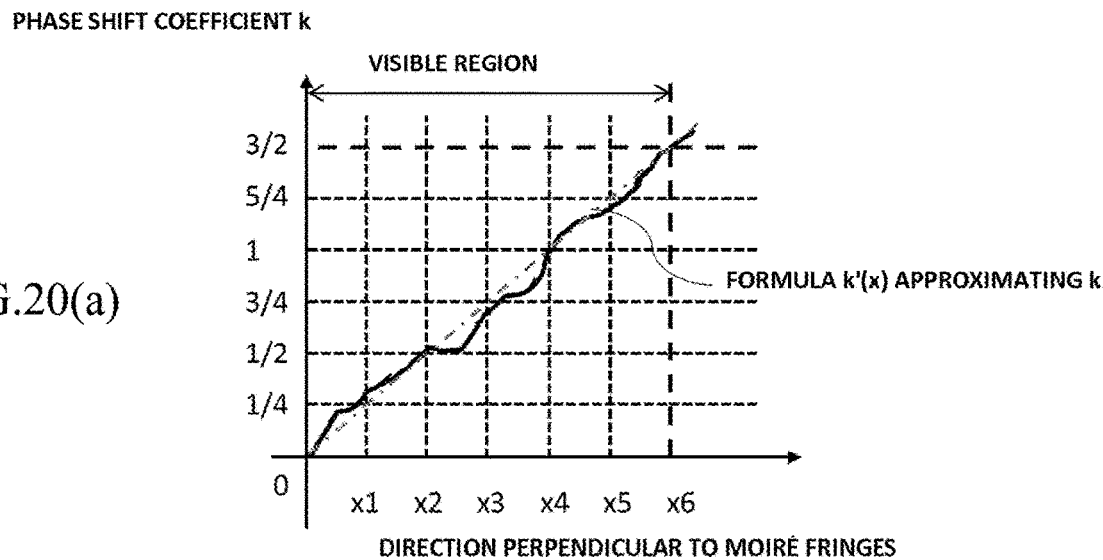
FIGS. 20(a)-20(b) show examples in which a phase shift coefficient k according to the present disclosure has noise.
Figure 20B:
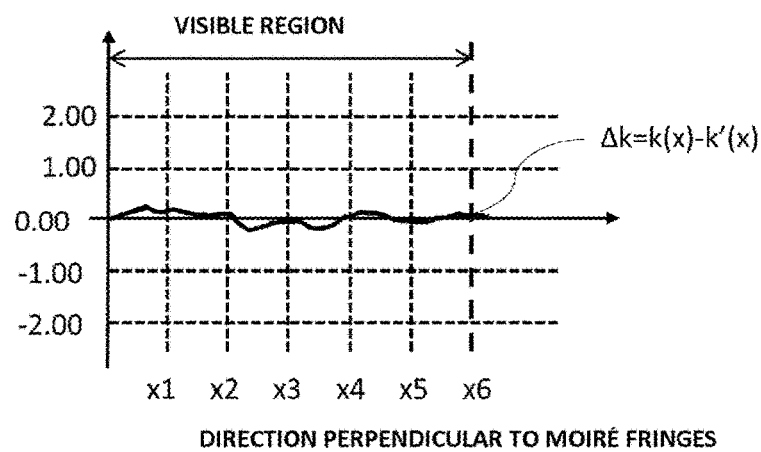

FIGS. 20(*a*)-20(*b*) shows an examples in which the phase shift coefficient k of the present example has noise. FIG. 20(*a*) shows changes in moiré fringe luminance when the phase shift coefficient k of the present example has noise. FIG. 20(*b*) shows an error between the phase shift coefficient k(x) and an approximation function k'(x).

As shown in FIG. 20(*a*), actual measurement values or the like having noise may be used as the phase shift coefficient k. In this case, the phase shift coefficient actual measurement value k(x) may be represented by the approximation function k'(x). The approximation method may be linear approximation, polynomial approximation, logarithmic approximation, exponential approximation, or the like. A least squares method or the like may also be used. A difference Δk between the phase shift coefficient actual measurement value k(x) and the approximation function k'(x) is preferably within ±2. This makes the movement of the moiré fringes appear to move naturally without discomfort. Furthermore, when Δk is ±1 or less, the smoothness in moiré image movement can be further enhanced.

As the phase shift coefficient k, continuous actual measurement values as they are may also be used.

8 Configuration of Moiré Display

Figure 21:
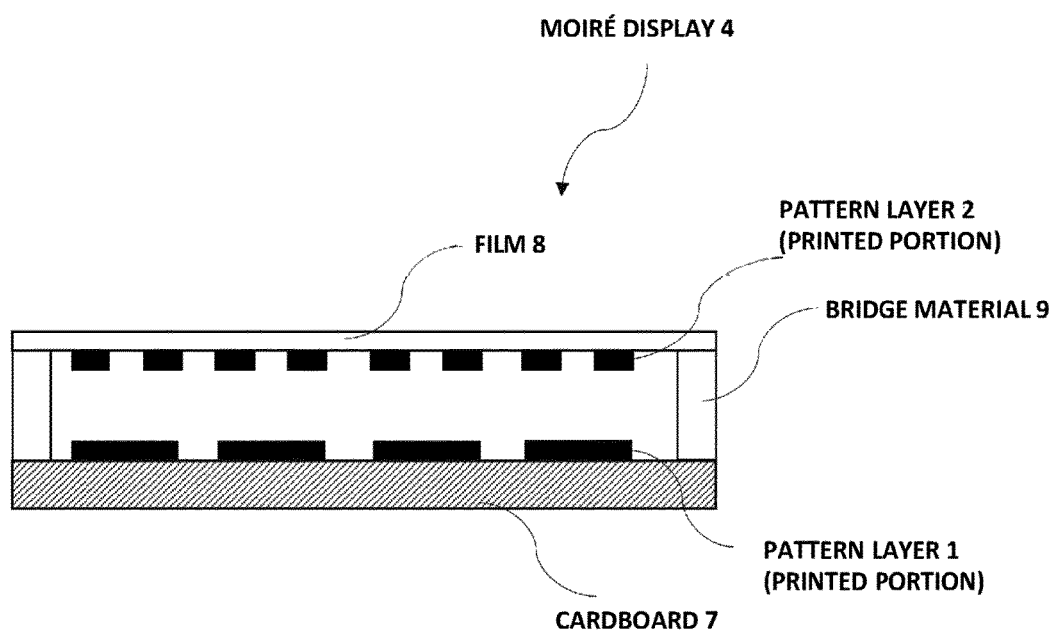
FIG. 21 is a diagram illustrating a cross-section of a configuration example (basic type) of the moiré display shown in FIG. 3 according to the present disclosure.

FIG. 21 is a diagram illustrating a cross-section of a configuration example (basic type) of the moiré display 4 shown in FIG. 3. In the example of FIG. 21, a cardboard 7 on which a pattern layer 1 is printed and a film 8 on which a pattern layer 2 is printed are connected by a bridge material 9.

The term "pattern layer" as used herein refers to a layer on which a pattern is drawn by printing or the like. The pattern layers 1 and 2 in FIG. 21 are the first pattern and the second pattern, respectively, outputted by the generating system. In the case of this basic type, the first pattern and the second pattern are printed between the cardboard 7 and the film 8.

In the example shown in FIG. 21, the cardboard 7 is preferably self-supporting. The film 8 may be made of a transparent material that transmits light. The bridge material 9 may be made of a transparent material that connects the cardboard 7 and the film 8 and transmits light, but may not necessarily be transparent. A support member for supporting the cardboard 7 may be attached. The cardboard 7 may be replaced with the film 8.

In the example shown in FIG. 21, a panel may be interposed between the cardboard 7 and the film 8. When the panel is interposed, the first pattern and the second pattern are in contact with the panel. Accordingly, in generation of a pattern, the thickness (gap) and the refractive index of a single panel may be considered.

Figure 22:
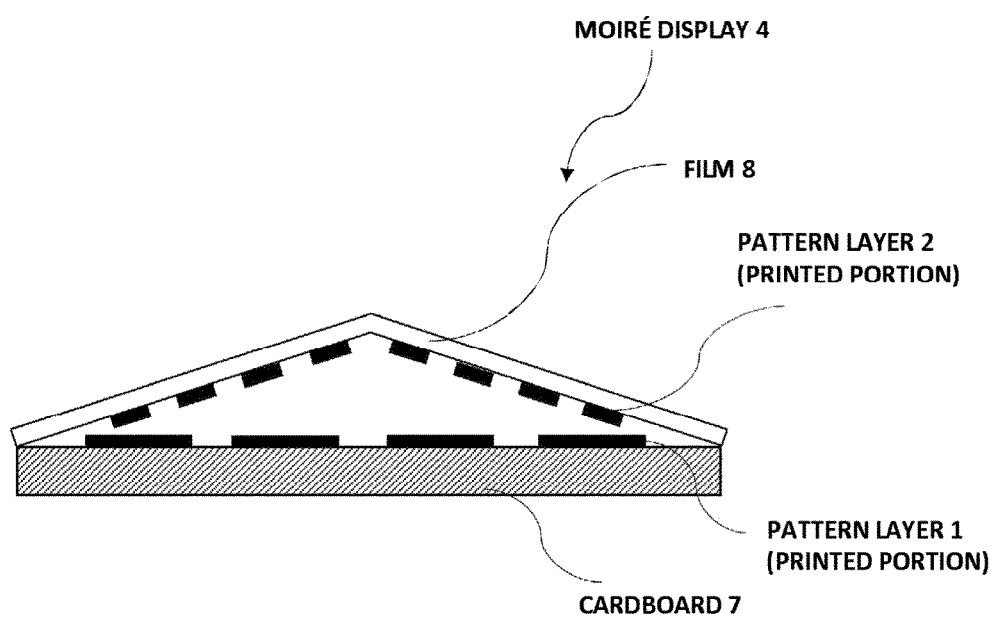
FIG. 22 is a diagram illustrating a cross-section of another configuration example (bent film type) of the moiré display according to the present disclosure.

FIG. 22 is a diagram illustrating a cross-section of another configuration example (bent film type) of the moiré display 4. In the example shown in FIG. 22, the film 8 is bent at or near the center. Further, the film 8 may be formed by bending a single sheet or by connecting two sheets together.

In the moiré display 4 shown in FIG. 22, a distance between the cardboard 7 and the film 8 varies depending on the position, and thus a distance between the pattern layer 1 of the first pattern and the pattern layer 2 of the second pattern also varies. Therefore, a more complicated moiré pattern can be formed.

Figure 23:
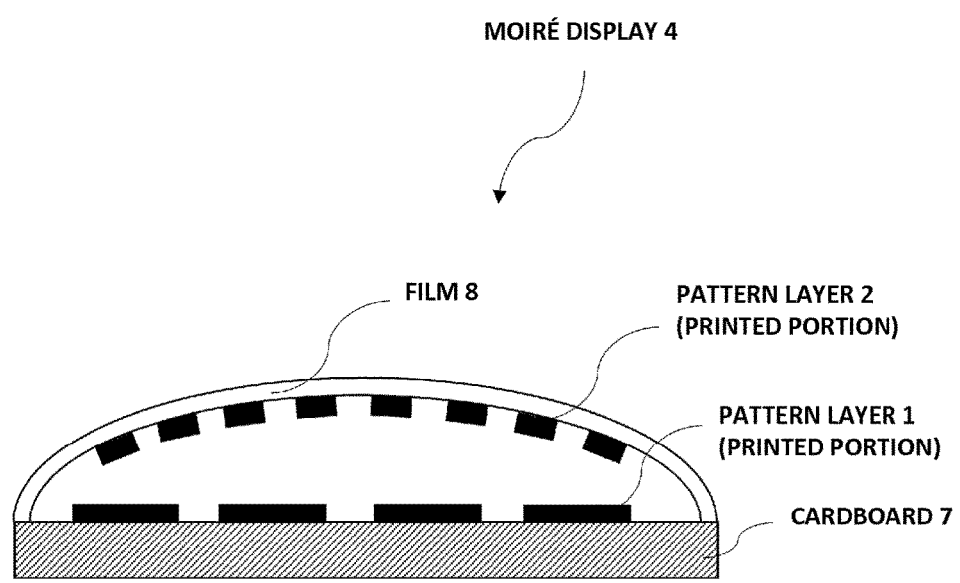
FIG. 23 is a diagram illustrating a cross-section of another configuration example (curved film type) of the moiré display according to the present disclosure.

FIG. 23 is a diagram illustrating a cross-section of another configuration example (curved film type) of the moiré display 4. In the example shown in FIG. 23, the film 8 is formed in a curved shape.

In the moiré display 4 shown in FIG. 23, a distance between the cardboard 7 and the film 8 varies depending on the position, and thus a distance between the pattern layer 1 of the first pattern and the pattern layer 2 of the second pattern also varies. Therefore, a more complicated moiré pattern can be formed.

Figure 24:
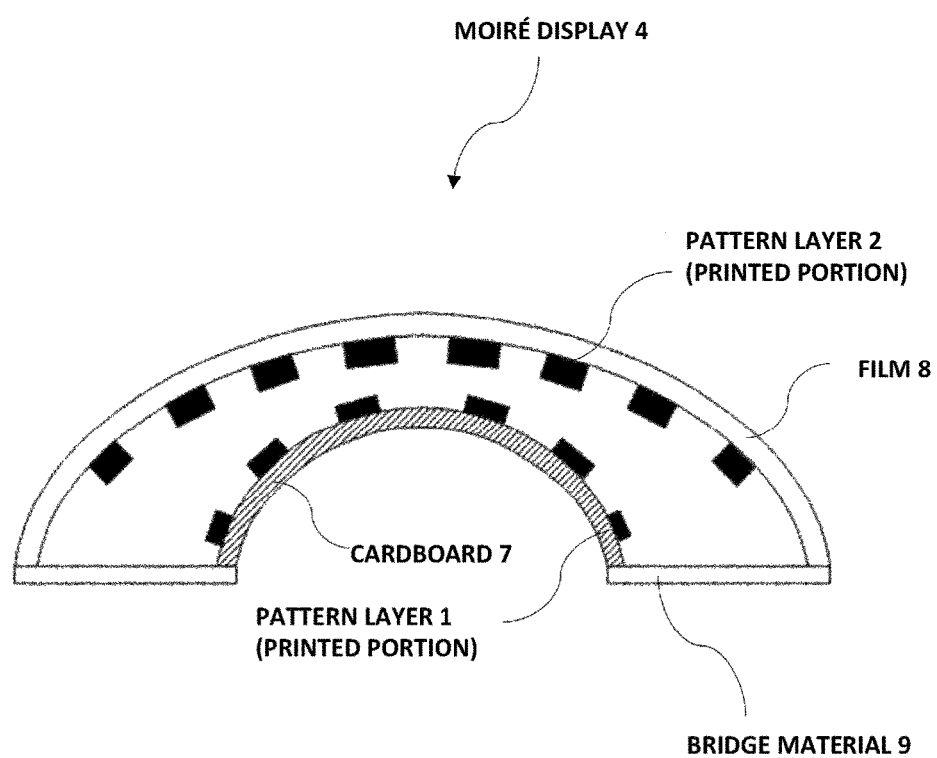
FIG. 24 is a diagram illustrating a cross-section of another configuration example (curved cardboard and film type) of the moiré display according to the present disclosure.

FIG. 24 is a diagram illustrating a cross-section of another configuration example (curved cardboard and film type) of the moiré display 4. In the example shown in FIG. 24, the cardboard 7 and the film 8 are formed in a curved shape.

In the moiré display 4 shown in FIG. 24, a distance between the cardboard 7 and the film 8 varies depending on the position, and thus a distance between the pattern layer 1 of the first pattern and the pattern layer 2 of the second pattern also varies. Further, the overlap between the first pattern and the second pattern varies depending on the position and direction in which the observer observes. Therefore, a more complicated moiré pattern can be formed.

Figure 25:
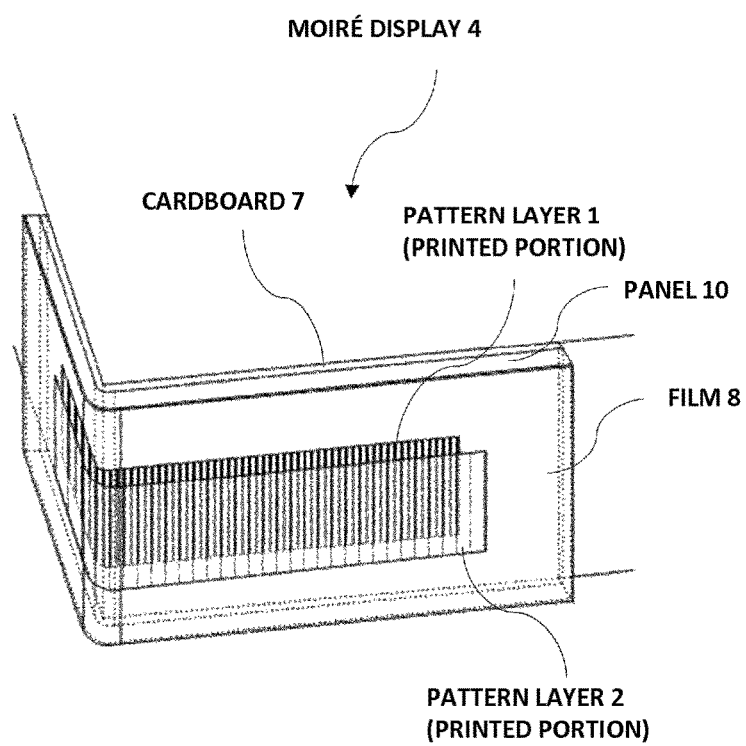
FIG. 25 is a diagram illustrating another configuration example (corner arrangement type) of the moiré display according to the present disclosure.

FIG. 25 is a diagram illustrating another configuration example (corner arrangement type) of the moiré display 4. In the example shown in FIG. 25, the cardboard 7 and the film 8 are formed in a curved shape with a panel 10 interposed therebetween on two wall faces and a corner of a passage or the like. The moiré display 4 shown in FIG. 25 can display continuously even on a corner.

In the configuration of the moiré display 4 described above, whether the pattern layers are provided between the film and the panel or on the opposite sides can be appropriately determined. However, in view of abrasion resistance and dust prevention, the pattern layers are preferably provided inside.

Further, the configurations described with reference to FIGS. 21 to 25 can be partially combined or modified. In the present example, a cardboard is used for forming the first pattern, but a film may be used. Other examples may use the example described in PTL 3.

9-0 Method for Generating Moiré Image-Producing Pattern

Figure 26:
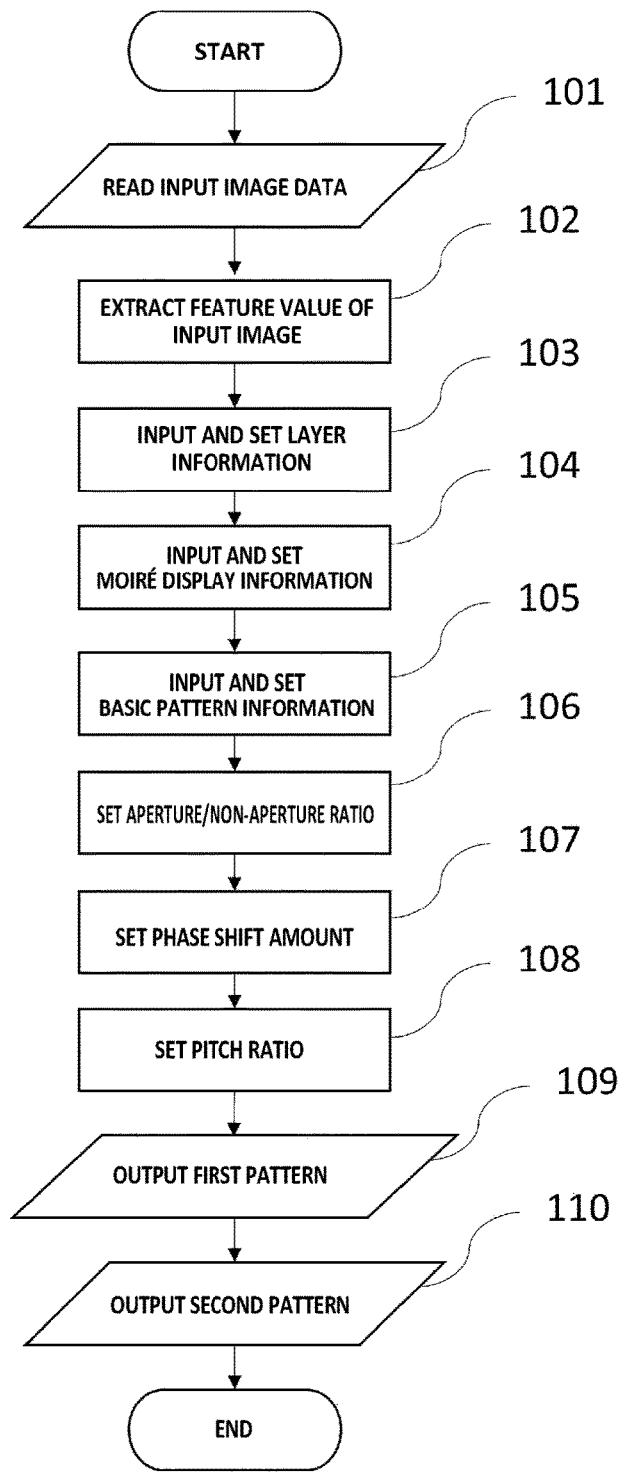
FIG. 26 is a flowchart for obtaining an output pattern according to the present disclosure as an image.

FIG. 26 is an example of a simplified flowchart for obtaining an output pattern as an image. However, the order of inputting information (input of information such as layer information) is not limited to that described in the flowchart.

First, in step 101, an input image data is read. As shown in FIG. 1, an image for which it is desired to create a moiré image is read as an input image. In the present example, and input image shown in FIG. 8 is read as data. The input image refers to an image data, such as a design pattern, for which creation of its moiré pattern is desired. The input image may be an image selected by the user or an image transmitted from a remote external device. Next, in step 102, a feature value of the input image is extracted. In the present example, the gradation of the input image shown in FIG. 8 is used as a feature value.

Next, in step 103, layer information is input. The layer information is information specifying a depth of a design or the like of the input image as shown in FIG. 2. The layer may be one layer or a plurality of layers.

Next, in step 104, moiré display information is input. In this step, a specific structure of the moiré display 4 as shown in FIG. 3 is input. In the present example, a distance between the first pattern and the second pattern, an observation angle, and the like are input as moiré display information for the moiré display 4 shown in FIGS. 21 to 25.

Next, in step 105, basic pattern information is input. The basic pattern may be a stripe pattern shown in FIGS. 7(a)-7(g). Next, in step 106, an aperture/non-aperture ratio is set. The aperture/non-aperture ratio may be set with reference to the aperture/non-aperture ratios of the stripe patterns shown in FIGS. 7(a)-7(g).

Next, in step 107, a phase shift amount is set. In the present example, the second pattern is shifted from the corresponding first pattern by the amount shown in formula (3). Further, in the present example, the phase shift coefficient k in formula (3) may be represented by a function. The function may be a continuous function, a step function, an approximation function, and the like as shown in FIGS. 10(a)-10(b) and 15 to 20.

Next, in step 108, a pitch ratio is set. The pitch ratio is set in a depth section for each layer. In the case of a single layer, no ratio is set.

In steps 103 to 108, moiré information specifying the conditions of a moiré-producing pattern is set. The moiré information may include at least one of information on the order of layers included in the input image (for example, the number of layers, order of layers, and the like), information on the basic configuration of the moiré-producing pattern, information on the overall size (expressed by pixels or distances), gradation information, and the like. The information on the basic configuration of the moiré-producing pattern may include, for example, at least one of information on the shape of the moiré-producing pattern (stripe, grid, or the like), the orientation of lines (vertical or oblique), the pitch, or desired sense of depth (depth distance at which moiré of the respective layers is generated), usage of the moiré pattern (material of the plate to which it is bonded, thickness, and observation distance), the phase shift amount of the pattern, and the like.

Next, in step 109, the first pattern is output. The first pattern is generated based on the input image extracted in steps 101 and 102, and the moiré information specifying the conditions of a moiré-producing pattern set in steps 103 to 108.

Next, in step 110, the second pattern is output. The phase of the second pattern continuously changes from a reference point relative to the first pattern in a region having at least one reference point.

As described above, due to the first pattern and the second pattern being generated by inputting the input image and moiré information specifying the conditions of a moiré-producing pattern, a moiré image with a sense of movement can be produced.

10-0 System for Generating Moiré Image-Producing Pattern

Next, with reference to FIG. 27, a computer system 300 for implementing an embodiment of the present disclosure will be described. Mechanisms and devices in various embodiments disclosed herein may be applied to any suitable computing system.

The major components of the computer system 300 include one or more processors 302, a memory 304, a terminal interface 312, a storage interface 314, an I/O (input/output) device interface 316, and a network interface 318. These components may be mutually connected via a memory bus 306, an I/O bus 308, a bus interface unit 309, and an I/O bus interface unit 310.

The computer system 300 may include one or more general purpose programmable central processing units (CPUs) 302A and 302B, which are collectively referred to as a processor 302. In one embodiment, the computer system 300 may include a plurality of processors, and in another embodiment, the computer system 300 may be a single CPU system. Each processor 302 may execute instructions stored in the memory 304 and include on-board cache.

In one embodiment, the memory 304 may include a random access semiconductor memory, a storage unit, or a storage medium (volatile or non-volatile) for storing data and programs. The memory 304 may store all or part of programs, modules, and data structures for implementing functions described herein. For example, the memory 304 may store a moiré-producing pattern generating application 350. In one embodiment, the moiré-producing pattern generating application 350 may include instructions or descriptions for executing functions described later, using the processor 302.

In one embodiment, the moiré-producing pattern generating application 350 may be implemented on a hardware via semiconductor devices, chips, logic gates, circuits, circuit cards, and/or other physical hardware devices instead of a processor-based system or in addition to a processor-based system. In one embodiment, the moiré-producing pattern generating application 350 may include data other than instructions or descriptions. In one embodiment, a camera, a sensor, or other data input devices (not shown) may be provided to directly communicate with the bus interface unit 309, the processor 302, or other hardware of the computer system 300.

The computer system 300 may include a bus interface unit 309 that performs communication among the processor 302, the memory 304, a display system 324, and the I/O bus interface unit 310. The I/O bus interface unit 310 may be connected to the I/O bus 308 that transfers data to and from various I/O units. The I/O bus interface unit 310 may communicate with the plurality of I/O interface units 312, 314, 316 and 318, which are also known as I/O processors (IOPs) or I/O adapters (IOAs), via the I/O bus 308.

The display system 324 may include either or both of a display controller and a display memory. The display controller can provide either or both of video data and audio data to a display unit 326. Further, the computer system 300 may include devices such as one or more sensors configured to collect data and provide the data to the processor 302.

For example, the computer system 300 may include a biometric sensor that collects heart rate data, stress level data, or the like, an environmental sensor that collects humidity data, temperature data, pressure data, or the like, and a motion sensor that collects acceleration data, motion data, or the like. Other types of sensors may also be used. The display system 324 may be connected to a display unit 326 such as a stand-alone display screen, television, tablet, portable device, or the like.

The I/O interface units have a function of communicating with various storages or I/O devices. For example, the terminal interface unit 312 can be connected to a user I/O device 320. Examples of the user I/O device 320 include user output devices such as a video display unit, speaker television, and the like, or user input devices such as a keyboard, mouse, keypad, touchpad, trackball, button, light pen or other pointing device, and the like.

The user may input data or instructions to the user I/O device 320 and the computer system 300 by controlling the user input device via a user interface, and receive output data from the computer system 300. The user interface may be displayed on a display unit, reproduced by a speaker, or printed via a printer, for example, via the user I/O device 320.

The storage interface 314 can be connected to one or more disk drives or direct access storage units 322 (usually a magnetic disk drive storage unit, but may also be an array of disk drives or other storage units configured to appear as a single disk drive). In one embodiment, the storage unit 322 may also be implemented as any secondary storage unit.

The contents of the memory 304 may be stored in the storage unit 322, and read from the storage unit 322 as needed. The I/O device interface 316 may provide an interface to other I/O devices such as a printer, fax machine, and the like. The network interface 318 may provide a communication path so that the computer system 300 can mutually communicate with other devices. The communication path may be, for example, a network 330.

In one embodiment, the computer system 300 may be a device that receives requests from other computer systems (clients) having no direct user interface, such as multi-user mainframe computer systems, single-user systems, and server computers. In another embodiment, the computer system 300 may be a desk top computer, a portable computer, a notebook computer, a tablet computer, a pocket computer, a telephone, a smartphone, or other suitable electronic device.

Figure 28:
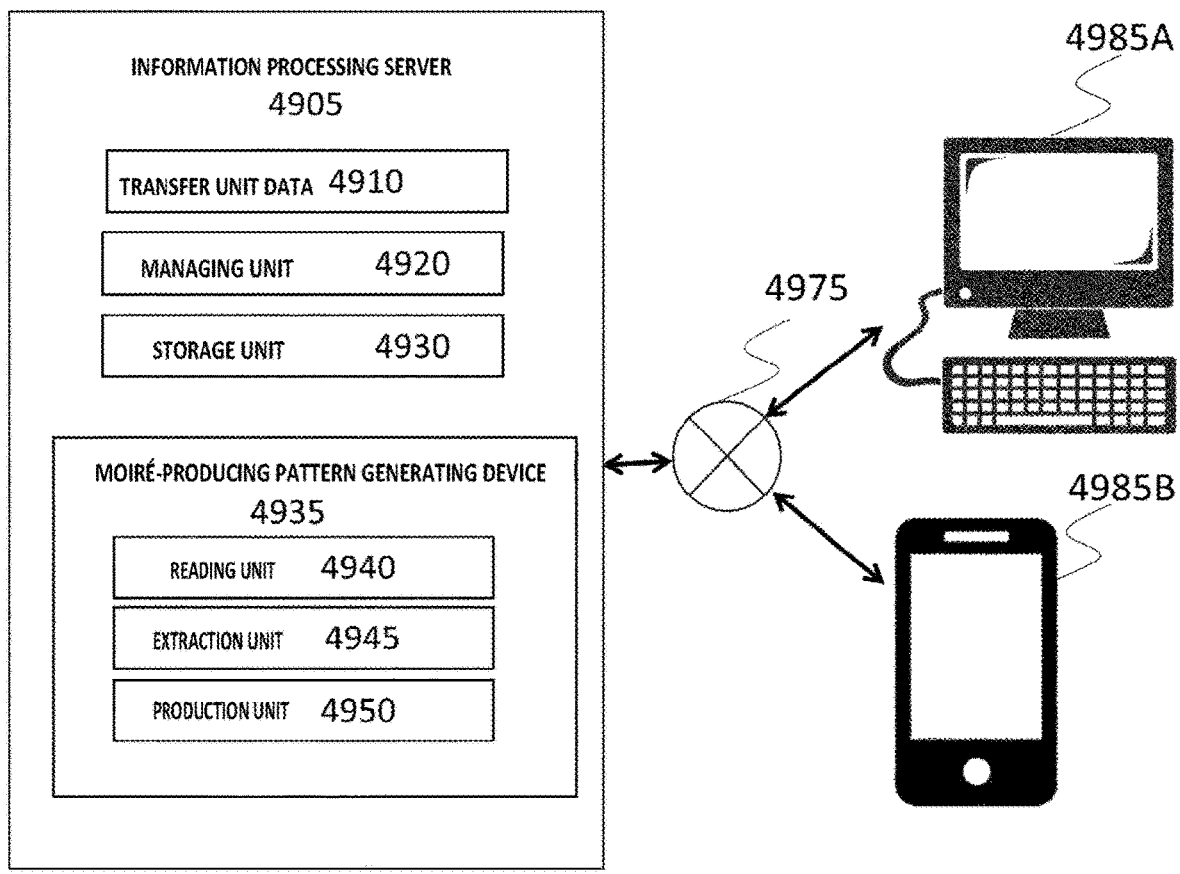
FIG. 28 is a diagram showing a configuration of a system for generating a moiré-producing pattern according to the present disclosure.

Next, with reference to FIG. 28, a system configuration according to the present disclosure will be described. FIG. 28 is a diagram showing a moiré-producing pattern generating system 4900 according to the present disclosure.

As shown in FIG. 28, the moiré-producing pattern generating system 4900 according to the present disclosure is mainly composed of an information processing server 4905, a network 4975, and client terminals 4985A and 4985B. The information processing server 4905 is connected to the client terminals 4985A and 4985B via the network 4975.

The information processing server 4905 is composed of a transfer unit 4910 that performs data transmission and reception with external devices such as the client terminals 4985A and 4985B, a data management unit 4920 that manages various data received from the client terminals 4985A and 4985B, a storage unit 4930 for storing input images and moiré information received from the client terminals 4985A and 4985B, and a moiré-producing pattern generating device 4935 for generating a moiré-producing pattern.

Further, as shown in FIG. 28, the moiré-producing pattern generating device 4935 includes a reading unit 4940 for reading an input image, an extraction unit 4945 for extracting a feature value of the input image, and a production unit 4950 for producing a moiré-producing pattern.

Figure 27:
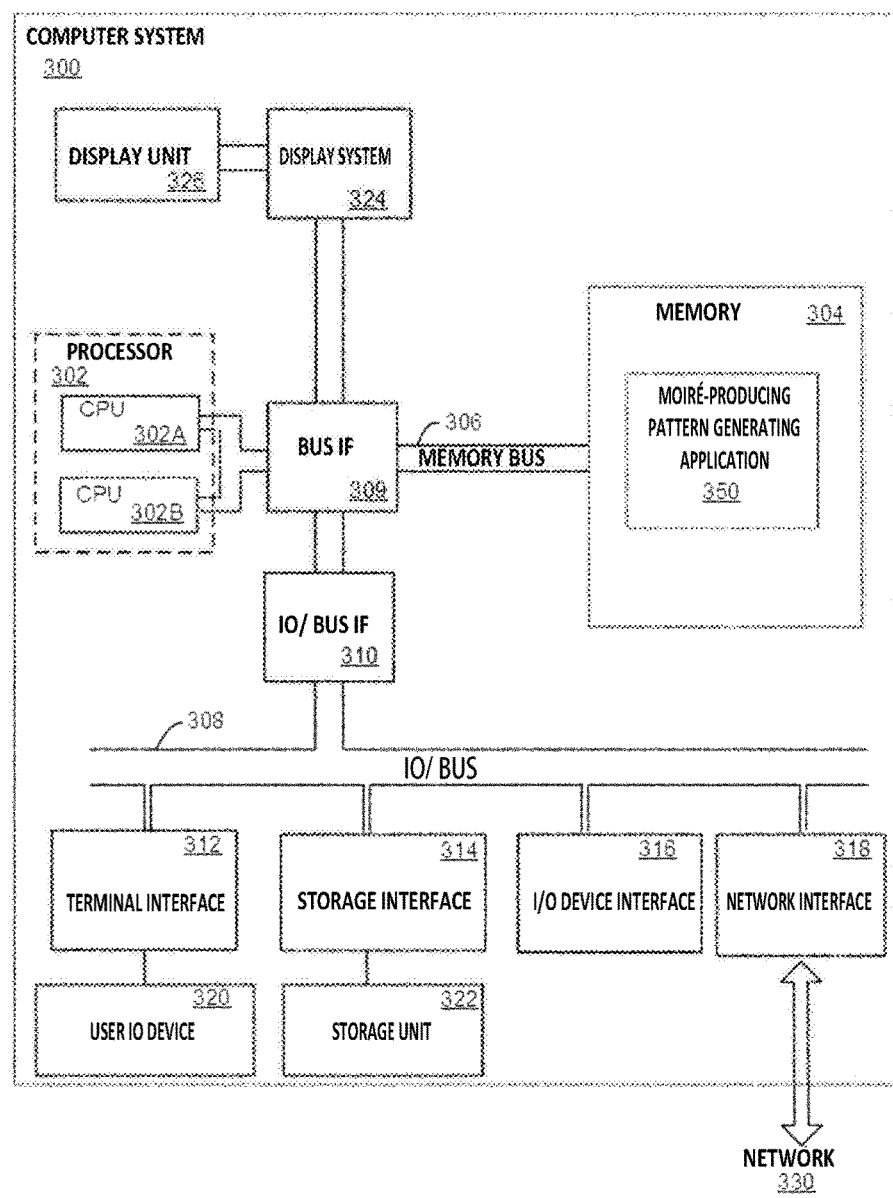
FIG. 27 is a diagram showing a configuration of a computer system for implementing an embodiment of the present disclosure.

Further, each functional unit included in the information processing server 4905 may be a software module constituting the moiré-producing pattern generating application 350 shown in FIG. 27, or may be an independent dedicated hardware device. Further, the above functional unit may be implemented in the same computing environment, or may be implemented in a distributed computing environment. For example, a moiré-producing pattern managing unit 235 may be mounted on a remote server, and other functional units may be mounted on local device such as the client terminals 4985A and 4985B.

The client terminals 4985A and 4985B are client terminals that receive information regarding a moiré-producing pattern generated by the moiré-producing pattern generating device 4935. These client terminals 4985A and 4985B may be terminals used by individuals or may be terminals in organizations such as police stations and private companies. These client terminals 4985A and 4985B may be, for example, a desktop computer, a notebook computer, a tablet, a smartphone, or any other device.

The present invention is not limited to the examples described above, and may also be various modified examples. For example, various modifications such as setting of the shape of the basic pattern, setting of the aperture/non-aperture ratio, and expressing data on the front side and rear side patterns are possible. In addition, the drawings used in the above examples are shown in detail in order to facilitate understanding of the present invention, and are not necessarily limited to the design patterns or the like shown in the examples.

For example, in the above description, examples for implementing the embodiments of the present invention by using the form of a device, a system, a method, or the like have been described. However, the embodiments of the present invention are not limited these examples, and may also be implemented in the form of printed matter (display), a computer program, or the like.

In addition, it should be noted that various modifications can be made to the setting of the phase shift amount, pitch ratio, aperture/non-aperture ratio, and the like described above. The phase shift amount may also be referred to as a phase variation amount.

The best mode for implementing the present invention has been described with reference to the drawings. However, the scope of the present disclosure is not limited to the embodiments illustrated and described above, and may also include all the embodiments that provide effects equivalent to those intended by the present invention. Furthermore, the scope of the present disclosure is not limited to the features of the invention defined in the claims, and includes all the features disclosed herein and all the combinations of these features.

The terms "unit," "system" and "network" as used herein refer to physical entities. The physical entities can be electrical circuits, their associated device, or combinations thereof connected via a wired/wireless network. These may have specific functions. These combinations having specific functions can exhibit a synergistic effect by combination of each function.

The terms used in the present disclosure and especially in the appended claims (for example, the text of the appended claims) are generally intended as "open" terms (for example, the term "has" should be interpreted as "at least has," and the term "includes" should be interpreted as "includes, but is not limited to," and the like).

In addition, in interpretation of terms, configurations, features, aspects, and embodiments, the drawings should be referred to as appropriate. Matters that can be directly and uniquely derived from the drawings, as well as the text, should be taken as grounds of correction.

Furthermore, when a claim recitation introducing a specific number is intended, such intention is expressly stated in the claims. Unless such a statement is provided, such intention does not exist. For example, in order to facilitate understanding, the following appended claims may include the use of introductory phrases "at least one" and "one or more" to introduce listing of claims.

However, the use of such terms should not be construed as meaning that introducing the claim recitation by the indefinite article "a" or "an" limits a specific claim including the above claim to an embodiment which includes only one such item. The introductory phrase "one or more" or "at least one" and the indefinite article "a" or "an" (for example, "a" and/or "an") should be at least interpreted as meaning "at least one" or "one or more". The same applies to the use of definite articles used for introduction of claim recitation.

REFERENCE SIGNS LIST

1: Pattern layer (first pattern); 2: Pattern layer (second pattern); 4: Moiré display; 5: Panel thickness; 6: Display region; 7: Cardboard; 8: Film; 9: Bridge material; 4900: Moiré-producing pattern generating system; 4905: Information processing server; 4910: Transfer unit; 4920: Data managing unit; 4930: Storage unit; 4935: Moiré-producing

What is claimed is:

1. A moiré display, comprising:
a first pattern; and
a second pattern disposed offset from the first pattern by a predetermined distance, the second pattern having a phase which continuously changes relative to the first pattern in at least one region, wherein
the second pattern has a phase that changes according to a function in at least one section, and wherein,
when a reference point is set, and, in coordinates relative to the reference point, a coordinate in a direction perpendicular to moiré fringes is x and a coordinate perpendicular to x is y,
a moiré intensity R of the first pattern satisfies the following formula (1),
a moiré intensity B of the second pattern satisfies the following formula (2), and
a phase shift amount PH representing a change in the phase of the second pattern relative to the first pattern satisfies the following formula (3):

[Math. 5]

$$R(x, y) = 0.5 + 0.5 \times \cos\left(2\pi \times \frac{x\cos a + y\sin a}{P}\right) \quad (1)$$

$$(x, y) = 0.5 + 0.5 \times \cos\left(2\pi \times \frac{x\cos a + y\sin a}{P} + PH(x, y)\right) \quad (2)$$

$$PH(x, y) = k \times 2\pi \times \frac{x\cos\alpha + y\sin\alpha}{P} \quad (3)$$

where α is a stripe angle, P is a stripe pitch, and k is a phase shift coefficient.

2. The moiré display of claim 1, wherein the phase shift coefficient k is represented by a function.

3. The moiré display of claim 1, wherein the phase shift coefficient k continuously changes.

4. The moiré display of claim 2, wherein the phase shift coefficient k satisfies k=ax+b, where a and b are constants.

5. The moiré display of claim 2, wherein the phase shift coefficient k changes radially from the reference point.

6. The moiré display of claim 2, wherein a plurality of the reference points exist.

* * * * *